(12) United States Patent
Davis et al.

(10) Patent No.: US 12,444,832 B2
(45) Date of Patent: Oct. 14, 2025

(54) MOBILE SURVEILLANCE SYSTEMS EXTENDABLE MAST CONTROL SYSTEMS AND METHODS

(71) Applicant: Teledyne FLIR Defense, Inc., Stillwater, OK (US)

(72) Inventors: Trevor Davis, Saanichton (CA); Edward Butler, North Saanich (CA); Bruce Haines, Victoria (CA)

(73) Assignee: Teledyne FLIR Defense, Inc., Stillwater, OK (US)

( * ) Notice: Subject to any disclaimer, the term of this patent is extended or adjusted under 35 U.S.C. 154(b) by 476 days.

(21) Appl. No.: 17/584,301

(22) Filed: Jan. 25, 2022

(65) Prior Publication Data

US 2022/0238987 A1    Jul. 28, 2022

Related U.S. Application Data

(60) Provisional application No. 63/142,961, filed on Jan. 28, 2021.

(51) Int. Cl.
| | |
|---|---|
| *H01Q 1/32* | (2006.01) |
| *H01Q 1/08* | (2006.01) |
| *H01Q 1/12* | (2006.01) |
| *H01Q 1/18* | (2006.01) |

(52) U.S. Cl.
CPC .............. *H01Q 1/3233* (2013.01); *H01Q 1/08* (2013.01); *H01Q 1/1235* (2013.01); *H01Q 1/1242* (2013.01); *H01Q 1/18* (2013.01)

(58) Field of Classification Search
None
See application file for complete search history.

(56) References Cited

U.S. PATENT DOCUMENTS

| | | | |
|---|---|---|---|
| 6,733,227 B2 | 5/2004 | Fitzgerald et al. | |
| 8,276,325 B2 | 10/2012 | Clifton et al. | |
| 2004/0123328 A1* | 6/2004 | Coffey | H04N 21/6125 |
| | | | 348/E7.086 |

(Continued)

OTHER PUBLICATIONS

Clark Masts, "Telescopic & Sectional Mast Systems", PT Series Specifications, Nov. 2014, 12 pages, Clark Mast Systems Ltd., Isle of Wright, United Kingdom.

(Continued)

*Primary Examiner* — Hongye Liang
(74) *Attorney, Agent, or Firm* — Haynes and Boone, LLP

(57) ABSTRACT

Mobile surveillance systems (MSSs) and related techniques are provided to improve the safety and operational flexibility of unmanned aircraft systems (UASs) and unmanned aerial vehicles (UAVs). An MMS may include an extendable mast, a motor configured to control movement of the extendable mast between a stowed position and a deployed position, and a logic device configured to communicate with and control the extendable mast and the motor. The logic device may be configured to adjust a speed of the motor based on a position of the extendable mast between the stowed position and the deployed position and based on deployment or stowing of the extendable mast. The logic device may be configured to adjust a torque of the motor based on the position of the extendable mast and based on deployment or stowing of the extendable mast.

20 Claims, 15 Drawing Sheets

(56) References Cited

U.S. PATENT DOCUMENTS

| | | | | |
|---|---|---|---|---|
| 2005/0264249 A1* | 12/2005 | Hsieh | ............... | H02P 23/26 |
| | | | | 318/438 |
| 2007/0069667 A1* | 3/2007 | Adra | ............... | H02P 25/18 |
| | | | | 318/135 |
| 2011/0106358 A1* | 5/2011 | Sawada | ............ | B60K 11/02 |
| | | | | 165/200 |
| 2015/0098780 A1* | 4/2015 | Robolotti | ............ | B66F 9/22 |
| | | | | 414/471 |

OTHER PUBLICATIONS

Clark Masts, "Telescopic & Sectional Mast Systems", WT Series Specifications, Oct. 2014, 12 pages, Clark Mast Systems Ltd., Isle of Wright, United Kingdom.

Clark Masts, "Telescopic & Sectional Mast Systems", XT Series Specifications, Dec. 2014, 12 pages, Clark Mast Systems Ltd., Isle of Wright, United Kingdom.

US Tower Corp., "Mobile Surveillance Solutions", Specifications, Mar. 2016, 6 pages, US Tower Corp., Woodlake, California, United States of America.

Fireco, "Military", Product Brochure, Aug. 2018, 12 pages, Fireco Telescopic Masts & Fire Equipment, Gussago, Italy.

Will-Burt, Military Elevation Solutions and Tactical Trailers, Product Brochure, Jan. 2021, 24 pages, The Will-Burt Company, Orrville, Ohio, United States of America.

\* cited by examiner

MOBILE SURVEILLANCE SYSTEMS EXTENDABLE MAST CONTROL SYSTEMS AND METHODS

CROSS-REFERENCE TO RELATED APPLICATIONS

This application claims the benefit of and priority to U.S. Provisional Patent Application No. 63/142,961 filed Jan. 28, 2021 and entitled "MOBILE SURVEILLANCE SYSTEMS EXTENDABLE MAST CONTROL SYSTEMS AND METHODS," which is incorporated herein by reference in its entirety.

This application is related to U.S. patent application Ser. No. 17/549,493 filed Dec. 13, 2021 and entitled "MOBILE SURVEILLANCE SYSTEMS AND METHODS FOR UAS OPERATIONAL SUPPORT," which claims the benefit of and priority to U.S. Provisional Patent Application No. 63/125,390 filed Dec. 14, 2020 and entitled "MOBILE SURVEILLANCE SYSTEMS AND METHODS FOR UAS OPERATIONAL SUPPORT," which are incorporated herein by reference in their entirety.

TECHNICAL FIELD

The present invention relates generally to surveillance systems and, more particularly, to systems and methods for extendable mast control of mobile surveillance systems.

BACKGROUND

Mobile surveillance systems (MSSs) may include an extendable mast providing an elevated platform for one or more sensors, such as configured to receive transponder data from manned and unmanned aircraft, marine watercraft, and/or terrestrial vehicles. Mast control may include two modes—a speed mode and a torque mode. The speed mode may be used to maintain a certain motor speed and will increase or decrease torque accordingly to maintain that speed. The torque mode may be used to maintain a certain torque and will increase or decrease speed to maintain that torque. Such configurations may present opportunities for damage to the system if the motor provides excessive torque in speed mode, or excessive speed in torque mode.

Therefore, there is a need in the art for systems and methods that address the deficiencies noted above, other deficiencies known in the industry, or at least offers an alternative to current techniques. For example, improvements are needed that allow the two modes to work together, such as operating an extendable mast in torque mode while at the same time limiting speed and/or operating the extendable mast in speed mode while at the same time limiting torque.

SUMMARY

Mobile surveillance systems (MSSs) to provide operational support for unmanned aircraft systems (UASs) including one or more unmanned aerial vehicles (UAVs) and related techniques are provided to improve the operation of unmanned flight platforms. One or more embodiments of the described MSSs may advantageously include an extendable mast, a motor configured to control movement of the extendable mast between a stowed position and a deployed position, and a logic device configured to communicate with and control the extendable mast and the motor. The logic device may be configured to adjust a speed of the motor based on a position of the extendable mast between the stowed position and the deployed position and based on a direction of movement of the extendable mast towards the stowed position or the deployed position (i.e., based on deployment or stowing of the extendable mast). The logic device may be configured to adjust a torque of the motor based on the position of the extendable mast and based on the direction of movement of the extendable mast (i.e., based on deployment or stowing of the extendable mast).

In another embodiment, a method includes deploying an extendable mast from a stowed position to a deployed position using a motor, wherein the extendable mast is configured to provide an elevated modular sensor mount. The method may include stowing the extendable mast from the deployed position to the stowed position using the motor. The method may include adjusting a speed of the motor based on a position of the extendable mast between the stowed position and the deployed position and based on a direction of movement of the extendable mast towards the stowed position or the deployed position (i.e., based on deployment or stowing of the extendable mast). The method may include adjusting a torque of the motor based on the position of the extendable mast and based on the direction of movement of the extendable mast (i.e., based on deployment or stowing of the extendable mast).

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
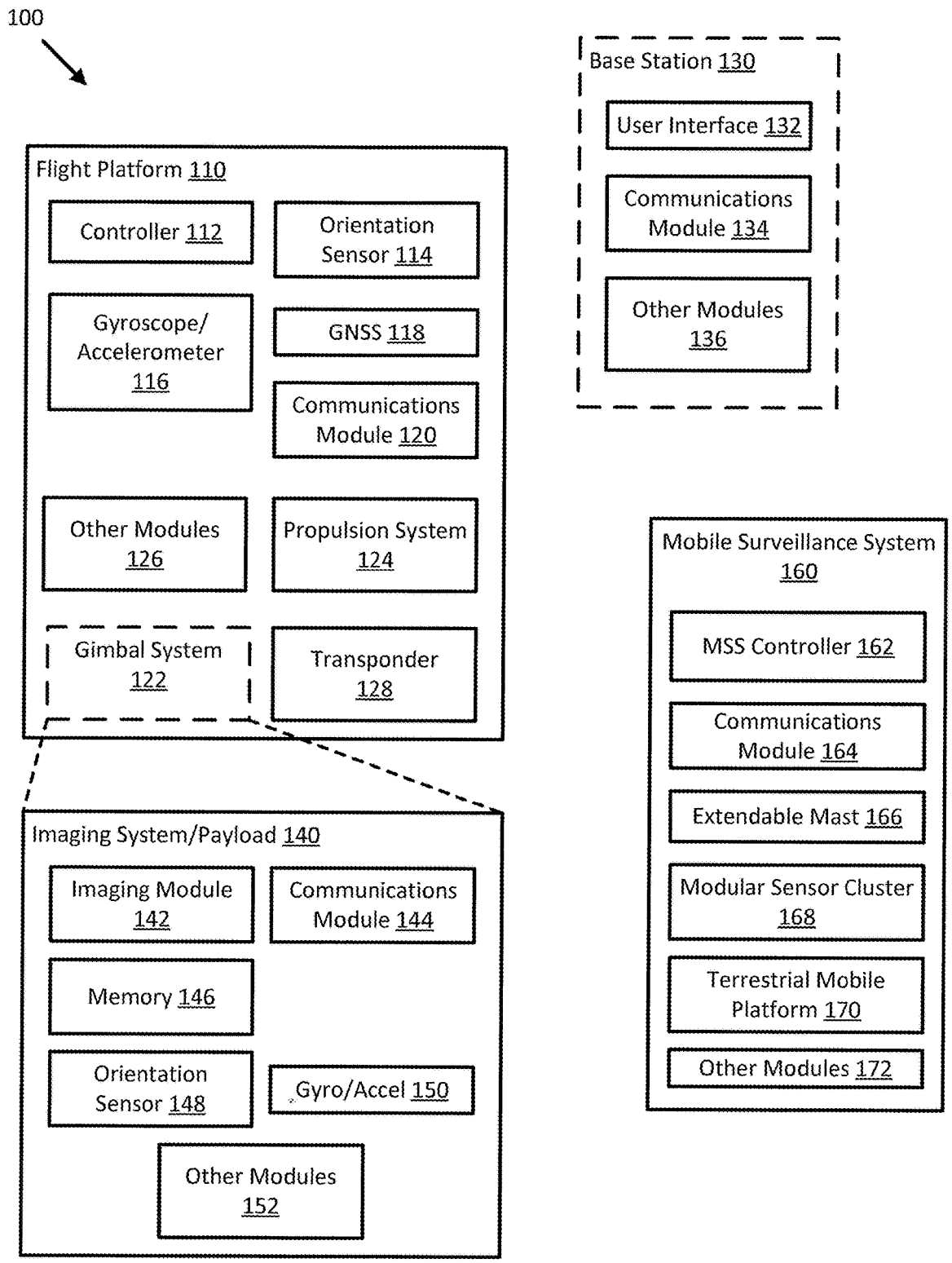
FIG. 1 illustrates a block diagram of an unmanned aircraft system (UAS) including a mobile surveillance system (MSS) in accordance with an embodiment of the disclosure.

Modern unmanned aerial vehicles (UAVs) can operate over long distances and in all environments but are generally restricted in deployable range by regulations regarding pilot and/or spotter sight. Embodiments described herein increase the safe flight range by providing a mobile surveillance system (MSS) able to deploy to a variety of different locales and to provide airspace deconfliction data and views that may be used by an operator to safely fly beyond line of sight, particularly with respect to relatively small UAVs (e.g., that may become effectively invisible beyond 1 km).

Embodiments provide a multi-functional, rapidly deployable mobile capability that supports U.S. Customs and Border Protection's (CBP) mission to safeguard America's borders. The system is designed for modularity—enabling the end user to select from a variety of sensor solutions to best meet the challenges in the operational area it is deployed. Embodiments may be implemented with mid-to-long-range radars and imaging systems to perform multiple mission sets. For example, CBP can easily re-deploy embodiments from mountainous terrain to a coastal environment. Embodiments with radar may be optimized for maritime targets and include an AIS receiver that continuously provides information from sea vessel transponders. More specifically, embodiments may be configured to provide air domain awareness. Some small unmanned aerial system (sUAS) programs can be restricted to flying UAVs with a minimum of two operators on-site (pilot and spotter) in order to avoid in-air collisions. Furthermore, the range of the UAV may be limited by the operator's sightline (approximately 1 km). By utilizing embodiments of the described MSS in place of the spotter, labor is freed to perform other critical duties. Additionally, the capability of the MSS on-board technology allows operators to coordinate with local regulators for permission to fly aircraft beyond line of sight, with the MSS deconflicting air traffic in the area, as described herein.

Embodiments provide a mast extendable from a mobile platform (e.g., a pickup truck or other vehicle). A modular sensor cluster may be configured to couple to a mount of the extendable mast to provide imaging, ranging, and communications, for example, as well as other airspace monitoring. The extendable mast may extend from (i.e., deploy) and collapse into (i.e., stow) the mobile platform. One or more motors (i.e., mast motors) may be configured to deploy and stow the extendable mast. A speed and a torque of the motor(s) may be controlled (e.g., adjusted) together, such as to limit potential damage from improper use, allow for a more repeatable mast motion, and/or allow for a "soft landing" into one or more hard stops, for instance. The speed and torque of the motor(s) may be adjusted during deployment of the extendable mast based on a position of the mast between a stowed position and a deployed position. Similarly, the speed and torque of the motors(s) may be adjusted during stowing of the extendable mast based on the position of the mast between the deployed position and the stowed position. The speed and torque may be adjusted based on the position of the mast relative to one or more hard stops defining the stowed position and/or the deployed position to provide a "soft landing" and/or limit excessive driving of the mast into the hard stops.

FIG. 1 illustrates a block diagram of an unmanned aircraft system (UAS) 100 including an MSS 160 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis.

In various embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target.

In the embodiment shown in FIG. 1, UAS 100 includes platform 110, optional base station 130, and at least one MSS 160. In general, platform 110 may be a mobile platform configured to move or fly and position payload 140 and/or platform 110 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, a transponder 128, and other modules 126. Sensor payload 140 may be physically coupled to platform 110 and be configured to capture sensor data (e.g., visible spectrum images, infrared images, narrow aperture radar data, analyte sensor data, orientation/attitude and/or position data, and/or other sensor data) of a target position, area, and/or object(s) as selected and/or framed by operation of platform 110 and/or base station 130, for example, and/or associated with maneuvering or navigation of platform 110, as described herein.

Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, MSS 160, and/or base station 130, such as the position and/or orientation of platform 110, sensor payload 140, and/or base station 130, for example, and the status of a communication link established between platform 110, sensor payload 140, MSS 160, and/or base station 130. Such communication links may be configured to be established and then used to transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), optional gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112, base station 130, and/or MSS 160. In further embodiments, communications module 120 may be configured to receive sensor information from MSS 160 and relay the sensor data to controller 112 and/or base station 130. In various embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, base station 130, and/or MSS 160. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, when present, optional gimbal system 122 may be implemented as an actuated gimbal mount, for example, that may be controlled by controller 112 to stabilize sensor payload 140 relative to a target or to aim and/or orient sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In still further embodiments, gimbal system 122 may be implemented as an actuated release mechanism to decouple and/or drop payload 140 according to control signals provided by controller 112 and/or relayed by communications module 120.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

In various embodiments, transponder 128 may be implemented similar to communications module 120 but be configured solely to transmit identification information, telemetry, and/or other sensor data associated with flight platform 110 and/or other elements of system 100.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 and/or elements of platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, platform 110, and/or MSS 160 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition to or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120, 134, and/or 164. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions. In alternative embodiments, where payload 140 is implemented as a package to be delivered to a target position, location, or destination, gimbal system 122 may be implemented as an actuated payload coupler configured to decouple or release or drop payload 140 (e.g., as controlled by controller 112, user interface 132, and/or other elements of system 100) from platform 110.

In various embodiments, MSS 160 may be implemented as a surveillance system with a variety of ranging and/or other sensors configured to monitor the airspace in which flight platform 110 is flying, such as to deconflict flight within the monitored airspace and/or provide additional airspace based operational support for flight platform 110, as described herein. In general, MSS 160 may be coupled to and/or include a mobile terrestrial platform in order to deploy to a number of different locations throughout the operational life of MSS 160. Moreover, by including modular sensor cluster 168, embodiments may mix and match different types of ranging and/or other types of sensors depending on the environment in which MSS 160 is deployed.

In the embodiment shown in FIG. 1, MSS 160 includes MSS controller 162, communications module 164, extendable mast 166, modular sensor cluster 168, terrestrial mobile platform 170, and/or other modules 172. In various embodiments, extendable mast 166 may be secured to terrestrial mobile platform 170 (e.g., configured to provide terrestrial mobility) and modular sensor cluster 168 may be configured to couple to a modular sensor mount of extendable mast 166 and provide ranging sensor data (e.g., radar, lidar, image data) corresponding to a selected airspace monitoring volume of MSS 160.

In various embodiments, modular sensor cluster 168 may include an actuated three-dimensional radar assembly configured to monitor and provide at least a portion of the ranging sensor data corresponding to approximately a quadrant of a hemispherical monitoring airspace volume centered at the elevated modular sensor mount of extendable mast 166. In other embodiments, modular sensor cluster 168 may include an actuated three-dimensional radar assembly configured to monitor and provide at least a portion of the ranging sensor data corresponding to at least a quadrant of a hemispherical monitoring airspace volume centered at the elevated modular sensor mount of extendable mast 166. Modular sensor cluster 168 may include an actuated imaging system configured to provide at least a portion of the ranging sensor data as image data, for example, and in some embodiments, communications module 164 may be integrated with modular sensor cluster 168.

MSS controller 162 may be configured to receive control signals and/or telemetry from platform 110 (e.g., via communications module 120 and/or transponder 128), for example, and/or to receive telemetry from sensors integrated with payload 140 (e.g., orientation sensor 148, gyroscope/accelerometer 150, other modules 152) and/or MSS 160 (e.g., other modules 170), and control operation of MSS 160 based, at least in part, on the received control signals and/or telemetry. In some embodiments, MSS controller 162 may be configured to control operation of MSS 160 independent of control signals and/or telemetry provided by other elements of platform 110, base station 130, and/or system 100.

More generally, MSS controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of MSS 160 and/or other elements of MSS 160, for example. Such software instructions may also implement methods for processing sensor signals, determining sensor information, providing user feedback (e.g., through user interface 132 via communications through communications module 164), querying devices for operational parameters, selecting operational parameters for devices, or performing any of the various operations described herein.

In addition, a non-transitory medium may be provided for storing machine readable instructions for loading into and execution by MSS controller 162, and such non-transitory medium may be implemented as internal and/or external memory and/or associated interfaces. In these and other embodiments, MSS controller 162 may be implemented with other components where appropriate, such as volatile memory, non-volatile memory, one or more interfaces, and/or various analog and/or digital components for interfacing with modules of MSS 160 and/or devices of system 100. For example, MSS controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, MSS controller 162 may be integrated with one or more other elements of MSS 160, for example, or distributed as multiple logic devices within platform 110, base station 130, and/or MSS 160.

In some embodiments, MSS controller 162 may be configured to substantially continuously monitor and/or store the status of and/or sensor data provided by one or more elements of MSS 160, such as the position and/or orientation of platform 110, MSS 160, and/or base station 130, for example, and the status of a communication link established between platform 110, MSS 160, and/or base station 130. Such communication links may be configured to be established and then transmit data between elements of system 100 substantially continuously throughout operation of system 100, where such data includes various types of sensor data, control parameters, and/or other data.

Communications module 164 of MSS 160 may be implemented as any wired and/or wireless communications module configured to transmit and receive analog and/or digital signals between elements of system 100, similar to other communications modules of system 100. For example, such communications module may be configured to receive control signals (e.g., control signals directing operation of MSS 160) from controller 112 and/or user interface 132. In some embodiments, such communications module may be configured to support spread spectrum transmissions, for example, and/or multiple simultaneous communications channels between elements of system 100.

Other modules 170 of MSS 160 may include other and/or additional sensors, actuators, communications modules/nodes, and/or user interface devices used to provide additional operational and/or environmental information associated with MSS 160, for example. In some embodiments, other modules 170 may include a humidity sensor, a wind and/or water temperature sensor, a barometer, an orientation sensor, a gyroscope/accelerometer, a GNSS, and/or other navigational or environmental sensors providing measurements and/or other sensor signals that can be displayed to a user and/or used by MSS controller 162 or other devices of system 100 (e.g., controller 112) to provide operational control of MSS 160, platform 110, and/or system 100, as described herein.

In various embodiments, other modules 170 may include a power supply implemented as any power storage device configured to provide enough power to each element of MSS 160 to keep all such elements active and operable while MSS 160 is otherwise disconnected from external power (e.g., provided by platform 170 and/or base station 130). In various embodiments, such power supply may be implemented by a supercapacitor so as to be relatively lightweight. Although system 100 is shown in FIG. 1 with a single MSS 160, in other embodiments, system 100 may include multiple MSSs 160.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
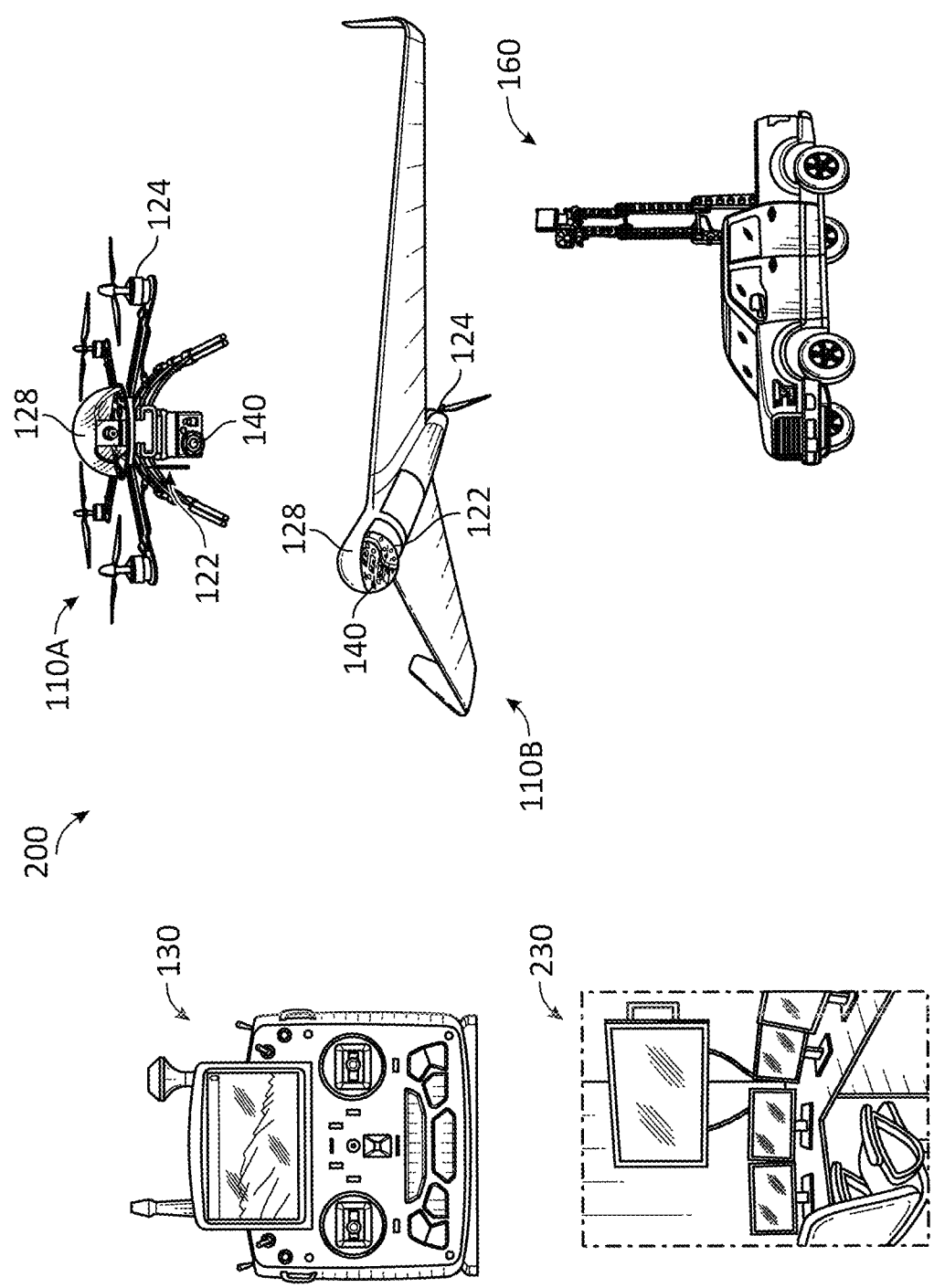
FIG. 2 illustrates a diagram of a UAS including multiple UAVs and an MSS in accordance with an embodiment of the disclosure.

FIG. 2 illustrates a diagram of mobile platforms/UAVs 110A and 110B of UAS 200 configured to receive operational support by embodiments of MSS 160 in accordance with an embodiment of the disclosure. In the embodiment shown in FIG. 2, UAS 200 includes base station 130, optional co-pilot station/remote aggregation server 230, mobile platform 110A with articulated imaging system/sensor payload 140, gimbal system 122, and transponder 128, and mobile platform 110B with articulated imaging system/sensor payload 140, gimbal system 122, and transponder 128, where base station 130 and/or optional co-pilot station 230 may be configured to control motion, position, orientation, and/or general operation of platform 110A, platform 110B, sensor payloads 140, and/or MSS 160.

In various embodiments, co-pilot station/remote aggregation server 230 may be implemented similarly relative to base station 130, such as including similar elements and/or being capable of similar functionality. In some embodiments, co-pilot station 230 may include a number of displays so as to facilitate operation of MSS 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any display views described herein.

Figure 3:
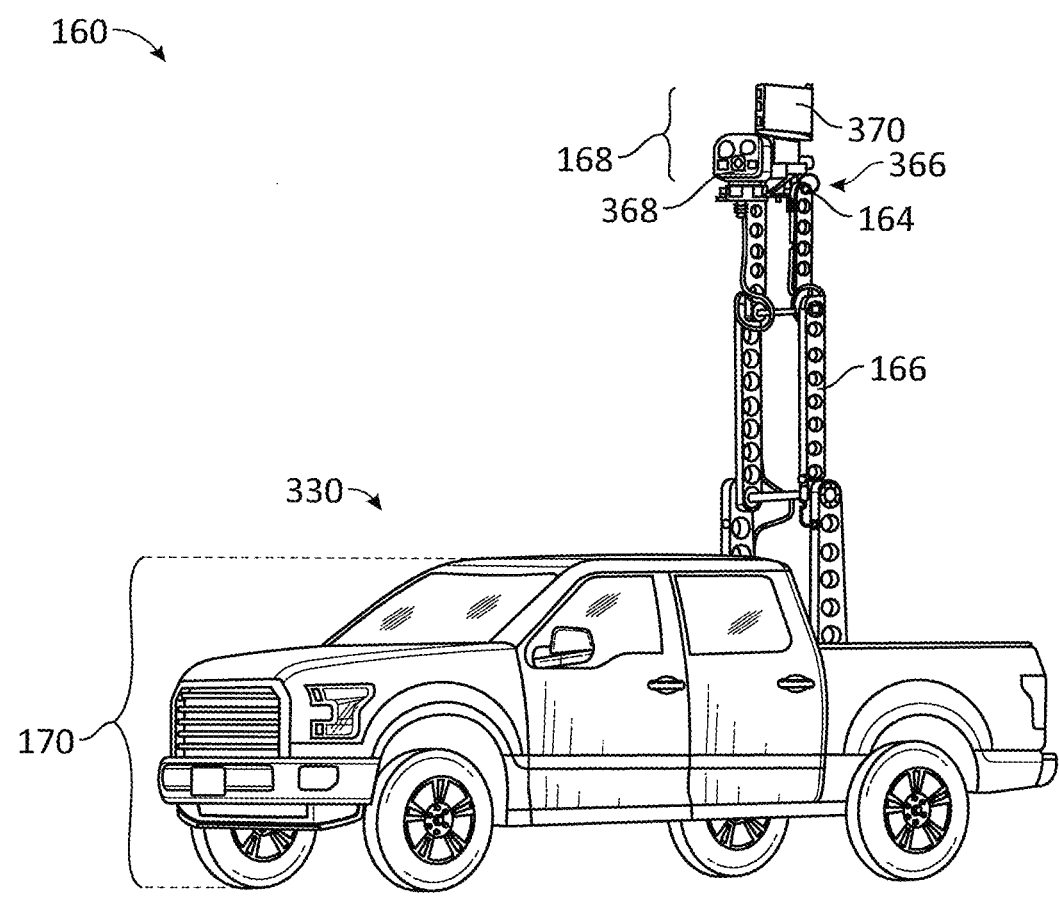
FIG. 3 illustrates a diagram of an MSS in accordance with an embodiment of the disclosure.

FIG. 3 illustrates a diagram of MSS 160 in accordance with an embodiment of the disclosure. In FIG. 3, MSS 160 includes extendable mast 166 providing elevated modular sensor mount 366, which may be used to couple to and/or mount modular sensor cluster 168. Extendable mast 166 may be secured to terrestrial mobile platform 170 (e.g., a pickup truck 330) and be able to collapse into a rear bed of terrestrial mobile platform 170 to protect MSS 160 during travel. Modular sensor cluster 168 may include a variety of sensors, including actuated 3D radar 370, actuated imaging system 368 (e.g., analogous to imaging system 140 and/or gimbal system 122), and/or communications module 164, which may be configured to receive transponder data from manned and unmanned aircraft, marine watercraft, and/or terrestrial vehicles.

Figure 4A:
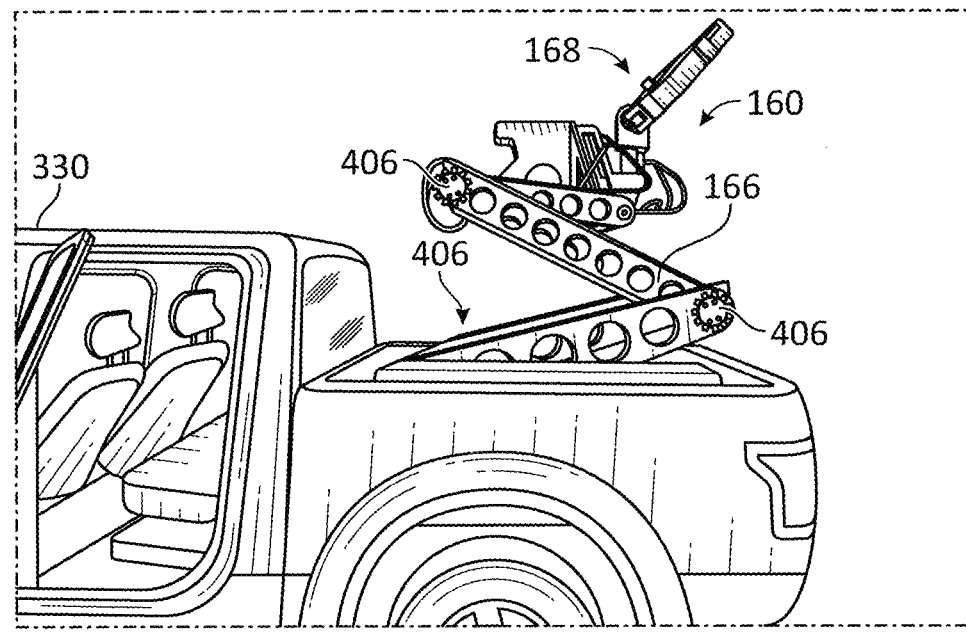
FIG. 4A illustrates an MSS in a first, partially deployed configuration in accordance with an embodiment of the disclosure.
Figure 4B:
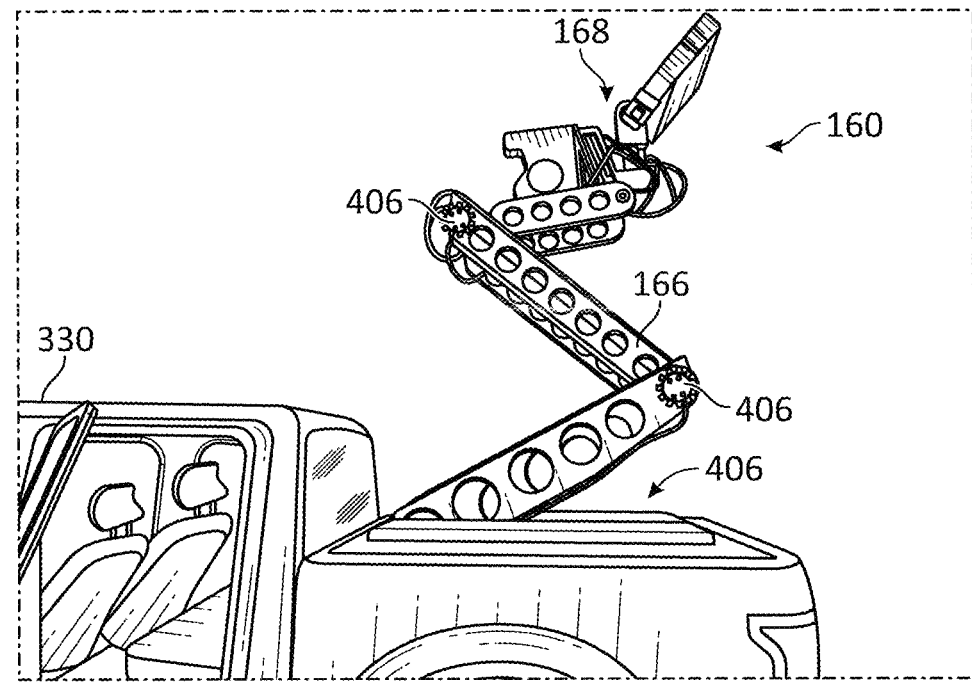
FIG. 4B illustrates the MSS of FIG. 4 in a second, partially deployed configuration in accordance with an embodiment of the disclosure.
Figure 4C:
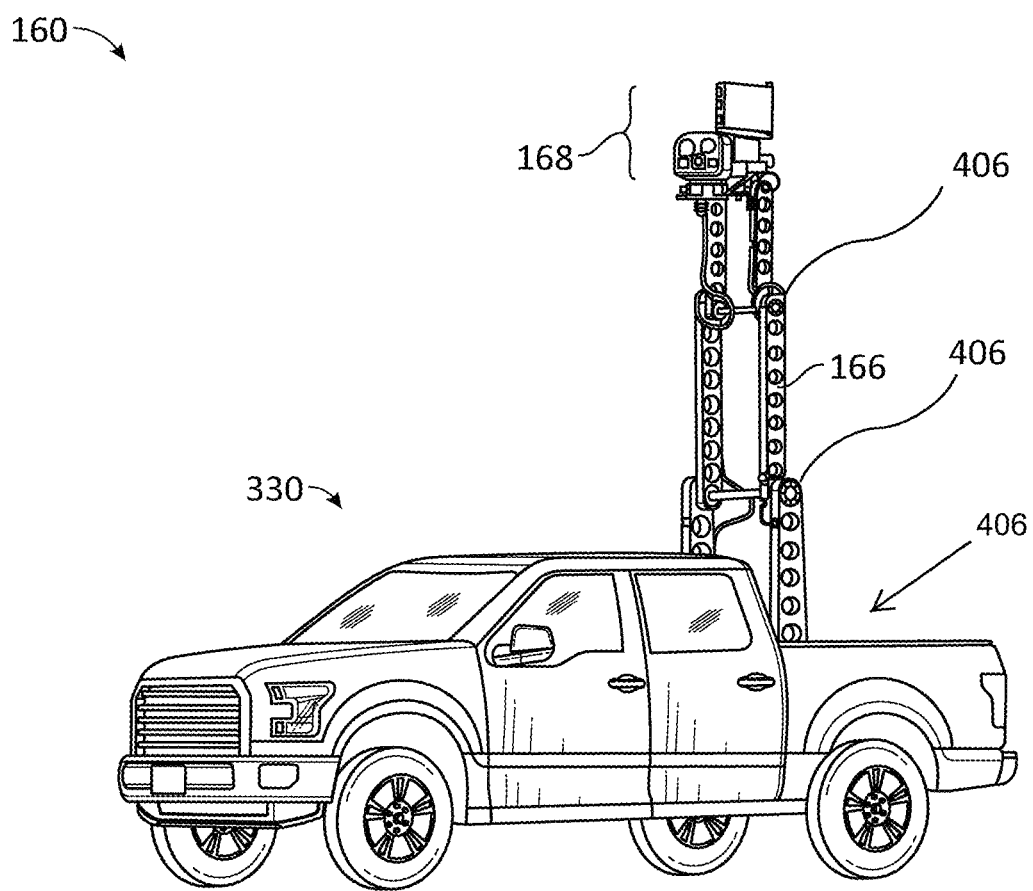
FIG. 4C illustrates the MSS of FIG. 4 in a third, fully deployed configuration in accordance with an embodiment of the disclosure.

FIG. 4A illustrates MSS 160 in a first, partially deployed configuration in accordance with an embodiment of the disclosure. FIG. 4B illustrates the MSS 160 in a second, partially deployed configuration in accordance with an embodiment of the disclosure. FIG. 4C illustrates the MSS 160 in a third, fully deployed configuration in accordance with an embodiment of the disclosure. In FIGS. 4A-4C, MSS 160 includes extendable mast 166 secured to pickup truck 330, although other terrestrial mobile platforms 170 are contemplated. Extendable mast 166 may extend from and collapse into the terrestrial mobile platform 170 (e.g., a rear bed of pickup truck 330). For example, extendable mast 166 may be collapsed into terrestrial mobile platform 170 to facilitate transport or other terrestrial mobility of terrestrial mobile platform 170. Once terrestrial mobile platform 170 is positioned as desired, MSS 160 may be deployed to elevate modular sensor cluster 168 for improved imaging, ranging, and communications, for example.

In embodiments, MSS 160 may include one or more hard stops defining a position of extendable mast 166. For instance, one or more hard stops may be defined at the fully stowed and fully deployed configurations of extendable mast 166. Depending on the application, the hard stops may be disposed on terrestrial mobile platform 170 and/or the extendable mast 166 itself. Extendable mast 166 may be deployed until at least a portion of extendable mast 166 engages a fully deployed hard stop, which limits further deployment or extension of extendable mast 166. Similarly, extendable mast 166 may be stowed until at least a portion of extendable mast 166 engages a fully stowed hard stop, which limits further stowing or collapsing of extendable mast 166. In embodiments, the extendable mast 166 may be driven into the hard stops (i.e., pre-load) to ensure rigidity of extendable mast 166 during operation and/or transportation.

Extendable mast 166 may be driven (e.g., deployed, stowed, etc.) using one or more motors 406. The motor(s) 406 may be provided at one or more of the pivot point(s) of the extendable mast 166 and/or may be disposed in the terrestrial mobile platform 170, such as in the bed of pickup truck 330. The motor(s) 406 may drive the extendable mast 166 through a gear box, although other configurations are contemplated. The motor(s) 406 may be supplied with speed limits/modes and/or torque limits/modes to control movement of extendable mast 166. For example, near the limits of mast movement (e.g., fully stowed, fully deployed), one or more torque limits or modes may ensure the extendable mast 166 is not driven into the end positions using excessive force. During the middle section of operation, one or more speed limits or modes may ensure the extendable mast 166 does not rise or fall too quickly. Movement of extendable mast 166 (i.e., operation of the one or more motors 406) may be controlled using MSS controller 162 or other logic device.

In embodiments, movement of extendable mast 166 (i.e., operation of the one or more motors 406) may be controlled using both speed and torque limits simultaneously. In this way, the mast motor(s) 406 may be further controlled, such as to reduce the risk of damage and allow a more repeatable mast motion. For example, having a torque limit during the middle section of operation may limit or prevent any potential damage from improper use (e.g., in case of raising or lowering extendable mast 166 into a foreign object, excessive ice or snow buildup, failure of one or more locks to release, etc.). As another example, having a speed limit near the limits of mast movement may allow a "soft landing" into the hard stops. In addition, a speed and torque limit combination may limit the extendable mast 166 from undesirably stopping before its final position, such as caused by varying friction loads.

The motor settings for speed, torque, and acceleration may be controlled dynamically, such as in real-time or near real-time. In embodiments, the settings may be controlled via CAN bus messaging, although other configurations are contemplated. In some embodiments, the speed, torque, and acceleration settings of mast motor(s) 406 may be set statically during initial motor configuration. In any case, the motor settings (e.g., firmware) may be set to allow a speed mode/limit and a torque mode/limit to work together. For instance, extendable mast 166 may be operated in a torque mode (e.g., near the limits of mast movement) while at the same time limiting speed. Similarly, extendable mast 166 may be operated in a speed mode (e.g., during the middle section of operation) while at the same time limiting torque. This may result in a robust system that is less susceptible to damage.

Figure 5:
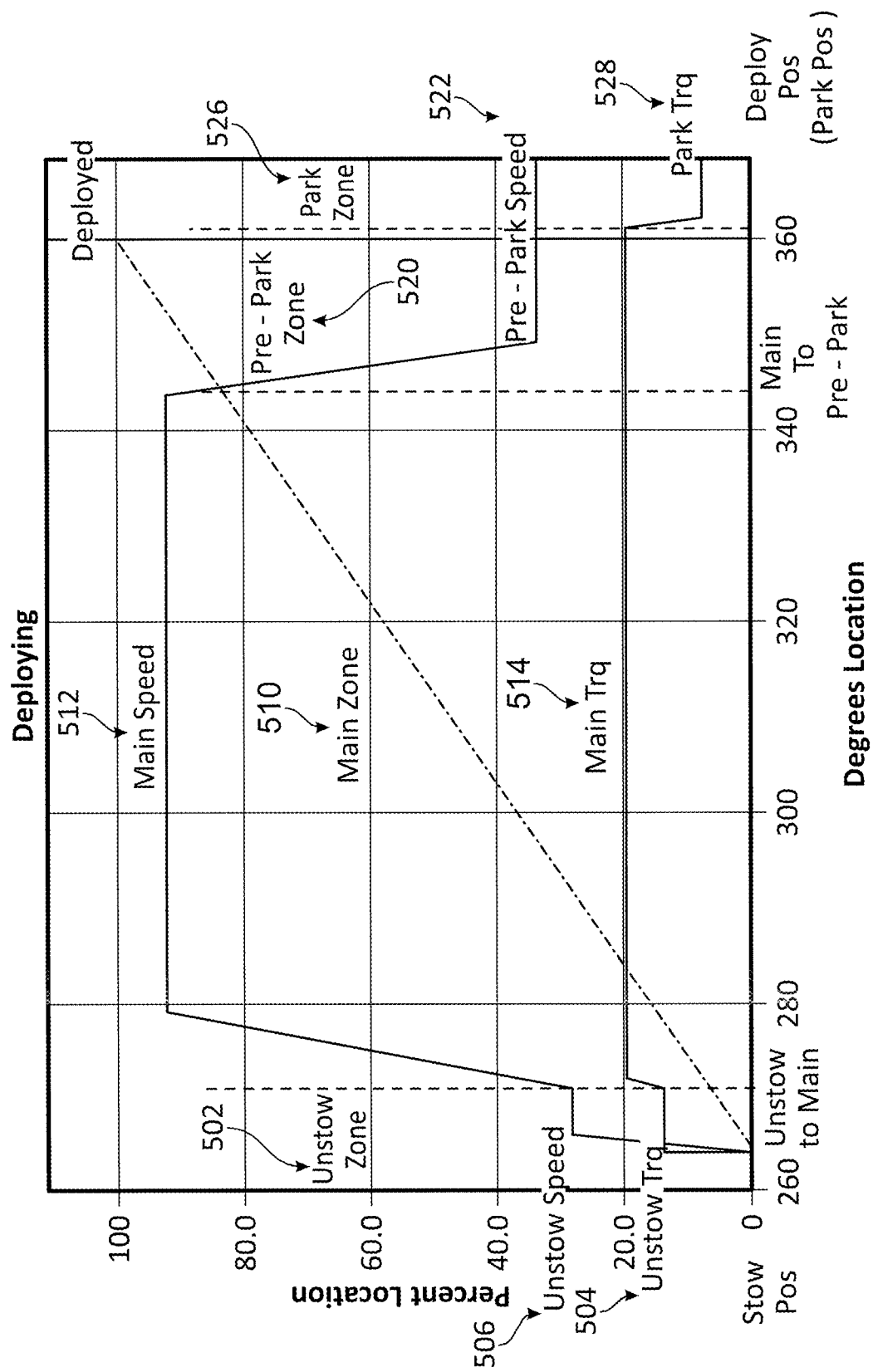
FIG. 5 illustrates a diagram of controlling a deployment of an MSS using torque and speed settings in accordance with an embodiment of the disclosure.

FIG. 5 illustrates a diagram of controlling a deployment of MSS 160 using torque and speed settings in accordance with an embodiment of the disclosure. FIG. 5 illustrates deployment of extendable mast 166, such as raising of extendable mast 166 from pickup truck 330 shown in FIGS. 4A-4C, in order. When extendable mast 166 begins moving out of the stow position (i.e., in unstow zone 502), the torque and speed are set low (i.e., at unstow torque 504 and unstow speed 506) to reduce the chance of damage if extendable mast 166 is caught on something (e.g., failure of one or more lock mechanisms to release, excessive ice or snow buildup, etc.). A moderate torque may be used to pull the extendable mast 166 off the stowed position. Once cleared of high-risk snags, the extendable mast 166 may reach main zone 510 where torque and speed are increased (e.g., to main speed 512 and main torque 514). As extendable mast 166 approaches the deployed position (i.e., in pre-park zone 520), the speed may be reduced (e.g., to a pre-park speed 522) to allow a soft landing. In park zone 526, the torque may be reduced (e.g., to a park torque 528) while still pressing extendable mast 166 into the hard stops to ensure adequate rigidity in the mast arm mechanism.

Figure 6:
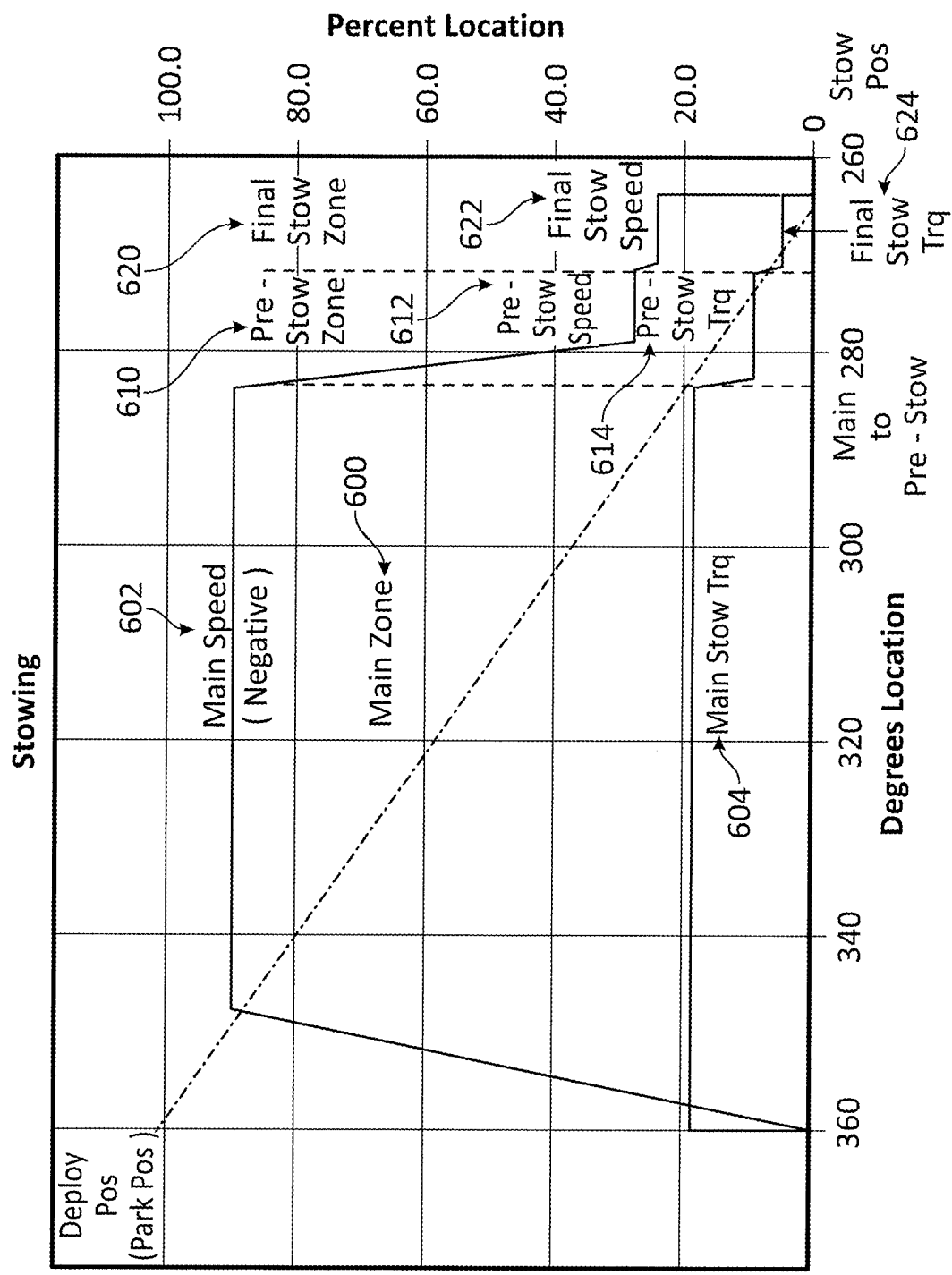
FIG. 6 illustrates a diagram of controlling a stowing of an MSS using torque and speed settings in accordance with an embodiment of the disclosure.

FIG. 6 illustrates a diagram of controlling a stowing of MSS 160 using torque and speed settings in accordance with an embodiment of the disclosure. FIG. 6 illustrates stowing of extendable mast 166, such as collapsing extendable mast 166 into the rear bed of pickup truck 330 shown in FIGS. 4A-4C, in reverse order. As extendable mast 166 moves off the deployed position hard stop(s) (i.e., in main zone 600), the speed and torque may be quickly ramped up to the appropriate level (e.g., to main speed 602 and main stow torque 604). The main stow torque 604 may be a higher torque to remove the extendable mast 166 from its hard stop at the deployed position. The higher torque may reliably remove the extendable mast 166 from its hard stop at the deployed position, especially after being deployed for a significant amount of time or during a large swing in temperature. As extendable mast 166 nears the stow position, the speed and torque may be reduced to allow for a soft landing into the stow location hard stop(s). For example, in pre-stow zone 610, speed may be reduced to a pre-stow speed 612, and torque may be reduced to a pre-stow torque 614. In final stow zone 620, speed may be reduced further to a final stow speed 622, and torque may be reduced further to a final stow torque 624.

Depending on the application, speed may be set in a range between 350 RPM and 5000 RPM, although other ranges are contemplated. Torque may be set in a range between 0.6 Nm and 6 Nm, although other ranges are contemplated. Speed may be set lower at the extents of movement, such as to avoid slamming into a hard stop while still allowing for quick operation during the middle operation zone. A moderate torque may be used to move extendable mast 166 off the stowed position, such as due to the possibility of a lock mechanism not disengaging properly. Using full torque if movement is restricted may result in damage. At the deployed or stowed position, torque may be set per design specifications for preload against the hard stop(s).

Figure 7A:
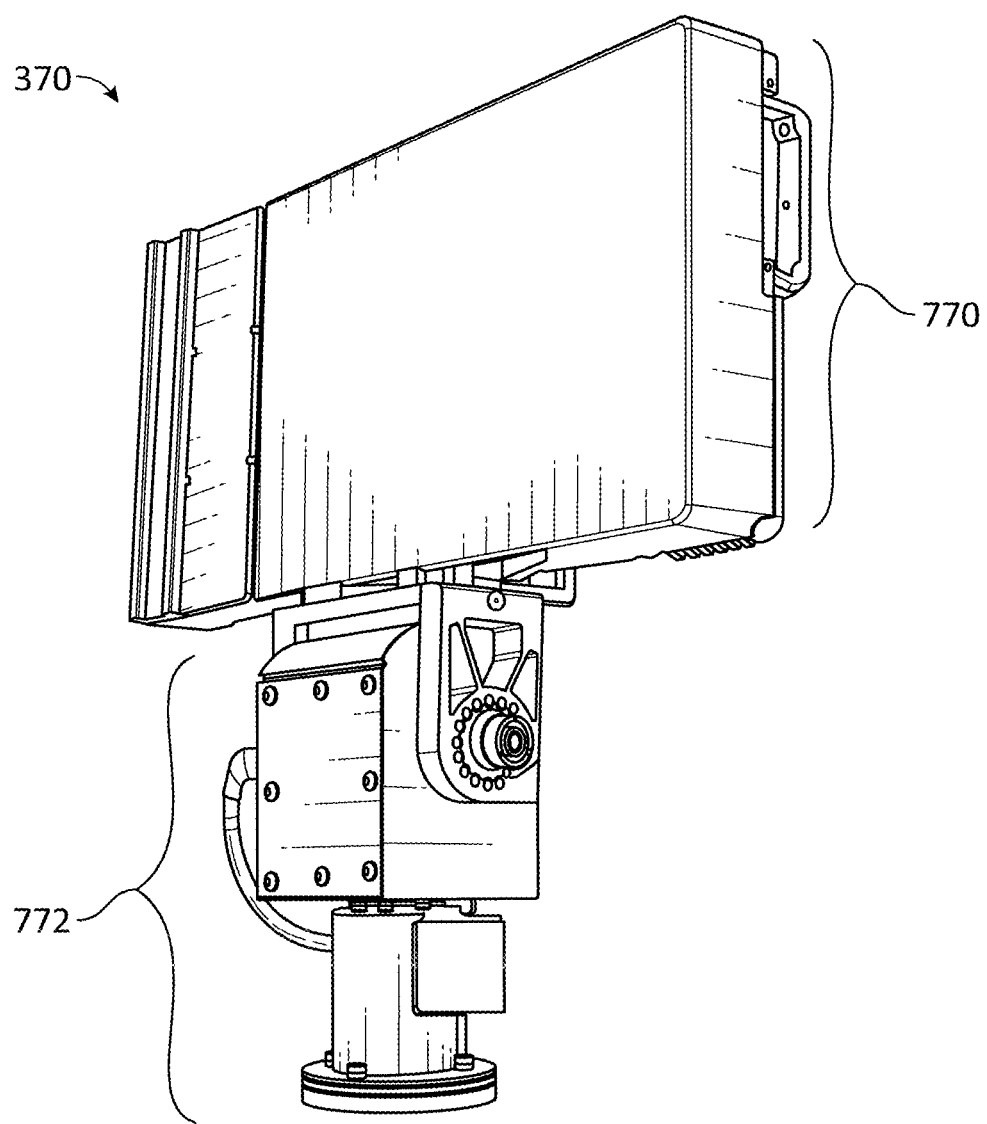
FIG. 7A illustrates a diagram of an actuated three-dimensional (3D) radar assembly for an MSS in accordance with an embodiment of the disclosure.

FIG. 7A illustrates a diagram of an actuated three-dimensional (3D) radar assembly 370 for MSS 160 in accordance with an embodiment of the disclosure. In FIG. 7A, actuated 3D radar assembly 370 includes radar panel 770 and actuated mount 772 (e.g., analogous to gimbal system 122) providing pan/tilt for radar panel 770. In various embodiments, radar assembly 370 may be configured to provide 10-8 k and/or 10-15 k range with angular accuracies of 0.8 or 0.5 degrees (azimuth) and 2 degrees (elevation) at 2 or 4 Hz, and may be configured to generate ranging data including relative and/or absolute position, identification, classification, and/or other target characteristics, as described herein.

Figure 7B:
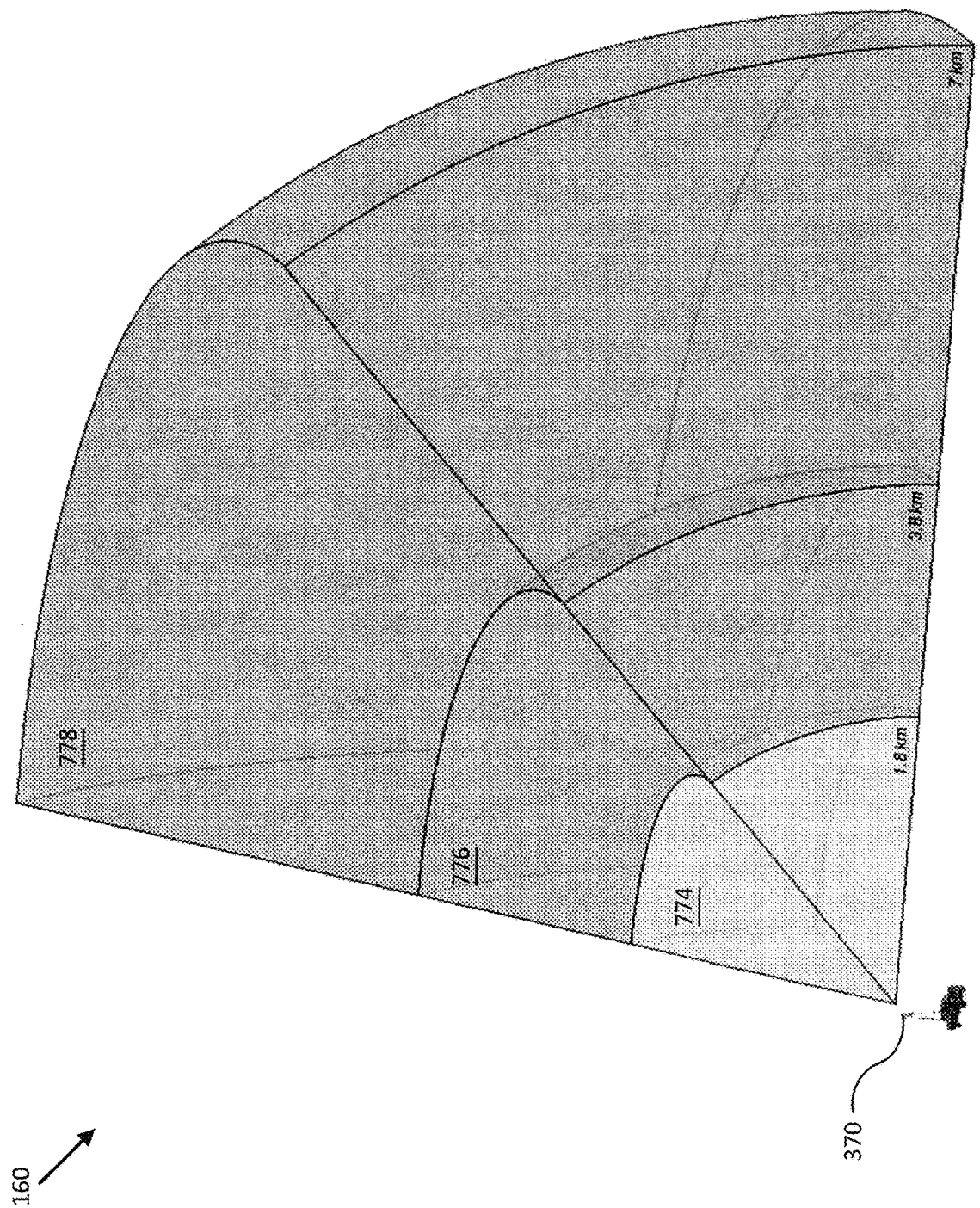
FIG. 7B illustrates a diagram of an actuated 3D radar assembly for an MSS in accordance with an embodiment of the disclosure.

FIG. 7B illustrates a diagram of actuated 3D radar assembly 370 for MSS 160 in accordance with an embodiment of the disclosure. In FIG. 7B, actuated 3D radar assembly 370 is configured to generate ranging data corresponding to airspace monitoring volumes 774, 776, and/or 778. Each volume may correspond to a quadrant of a hemisphere centered on MSS 160, for example, and may be swept around MSS 160 to generate 360 degrees of coverage, as described herein.

Figure 7C:
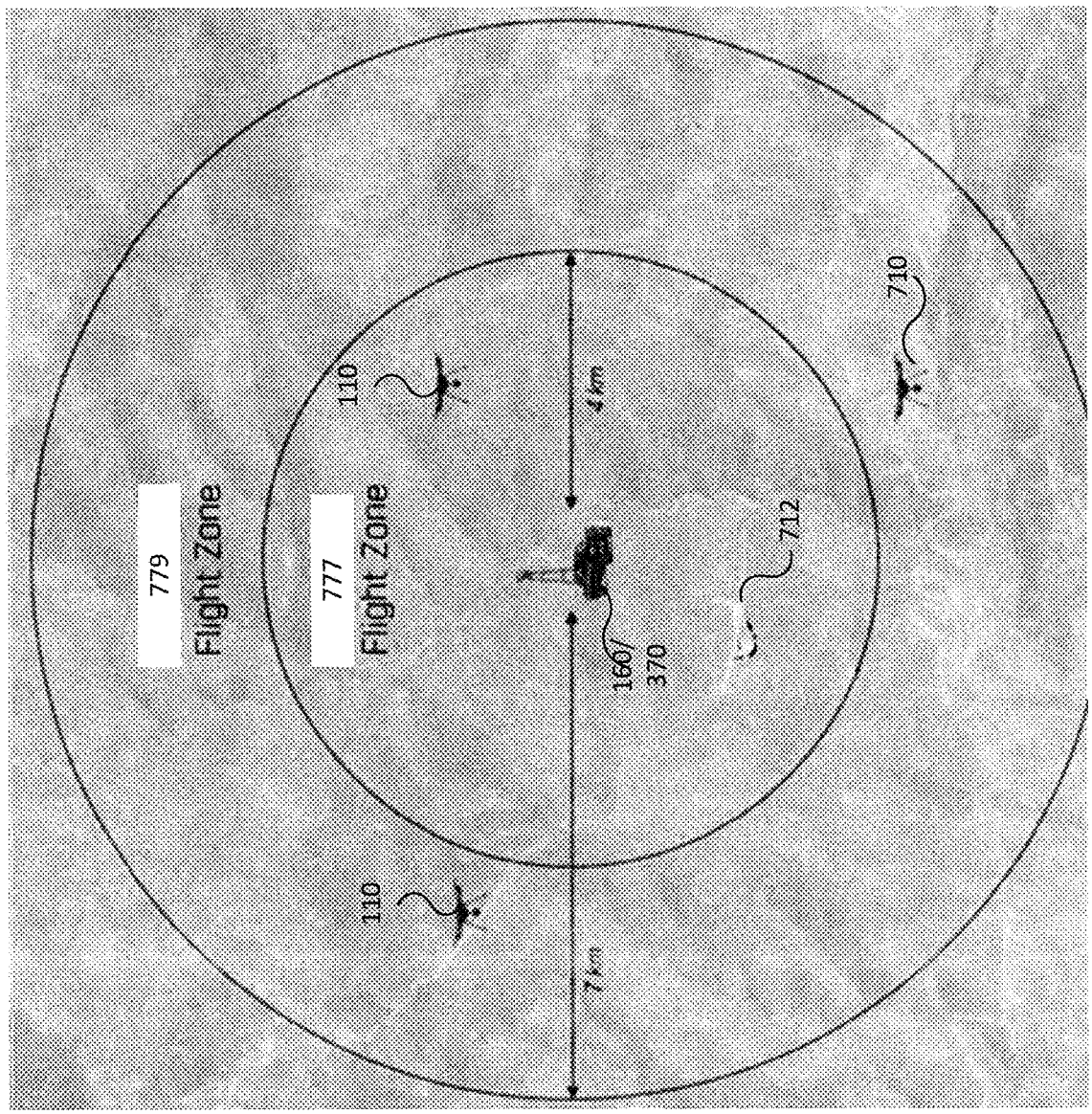
FIG. 7C illustrates a diagram of a UAS including an MSS with an actuated 3D radar assembly in accordance with an embodiment of the disclosure.

FIG. 7C illustrates a diagram of UAS 100 including MSS 160 with actuated 3D radar assembly 370 in accordance with an embodiment of the disclosure. In FIG. 7C, MSS 160 is detecting and determining positions of UAVs 110 of UAS 100, affiliated/unaffiliated aircraft 712, and unaffiliated UAV 710 within airspace monitoring volumes 777 and 779, such as by sweeping actuated 3D radar assembly 370 about MSS 160.

Figure 8:
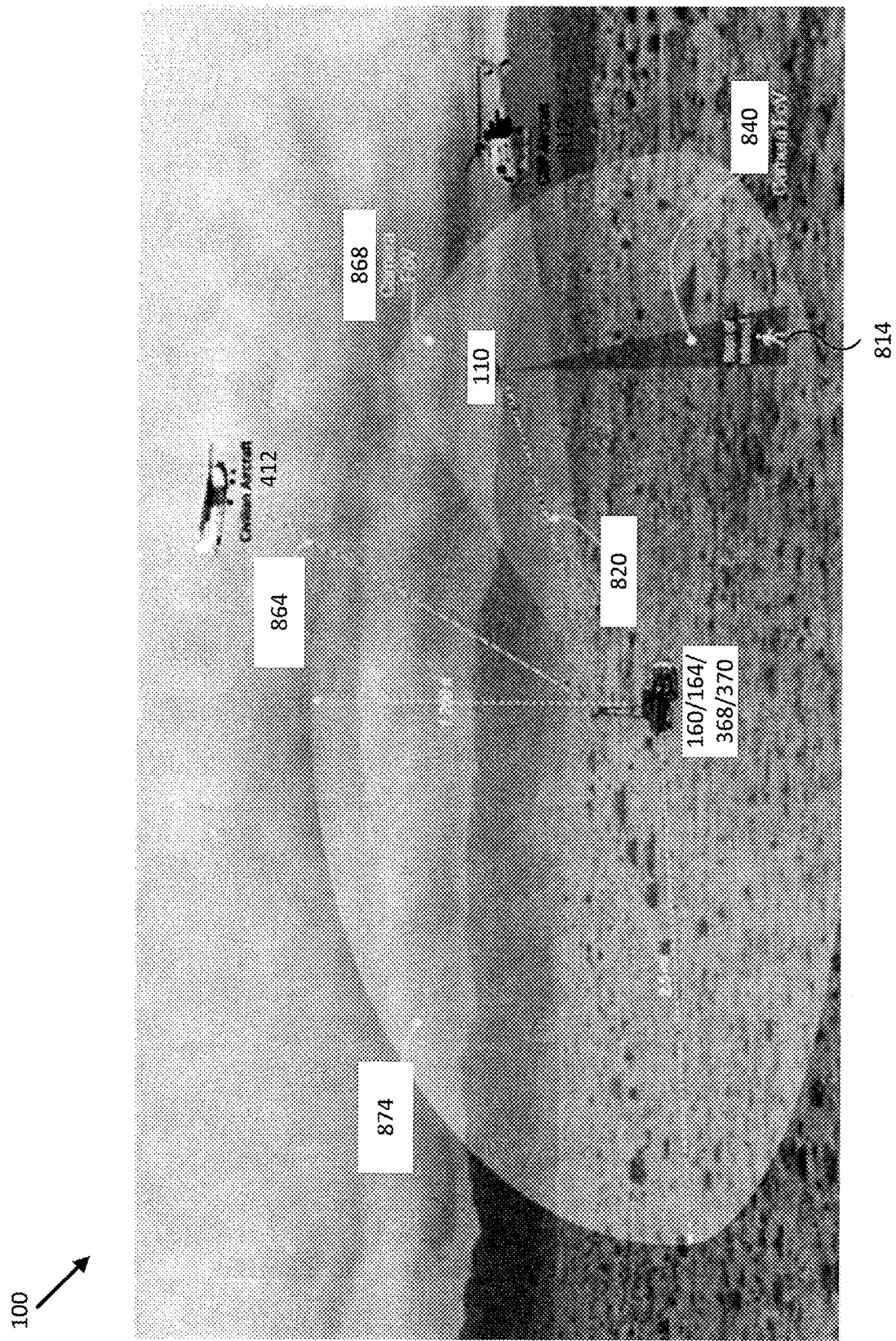
FIG. 8 illustrates a diagram of a UAS including an MSS with an actuated 3D radar assembly and an actuated imaging system in accordance with an embodiment of the disclosure.

FIG. 8 illustrates a diagram of a UAS 100 including MSS 160 with actuated 3D radar assembly 370, communications module 164, and actuated imaging system 368 in accordance with an embodiment of the disclosure. In FIG. 8, actuated 3D radar assembly 370 is monitoring field of regard 874 by sweeping through the hemisphere, communications module 164 is receiving transponder data from affiliated/unaffiliated aircraft 712, actuated imaging system 368 is providing image data associated with field of view 868 including UAV 110, UAV 110 is providing image data of person of interest/terrestrial target 814 according to field of view 840 of imaging system 140, and affiliated aircraft 812 is receiving and providing telemetry via MSS 160.

Figure 9:
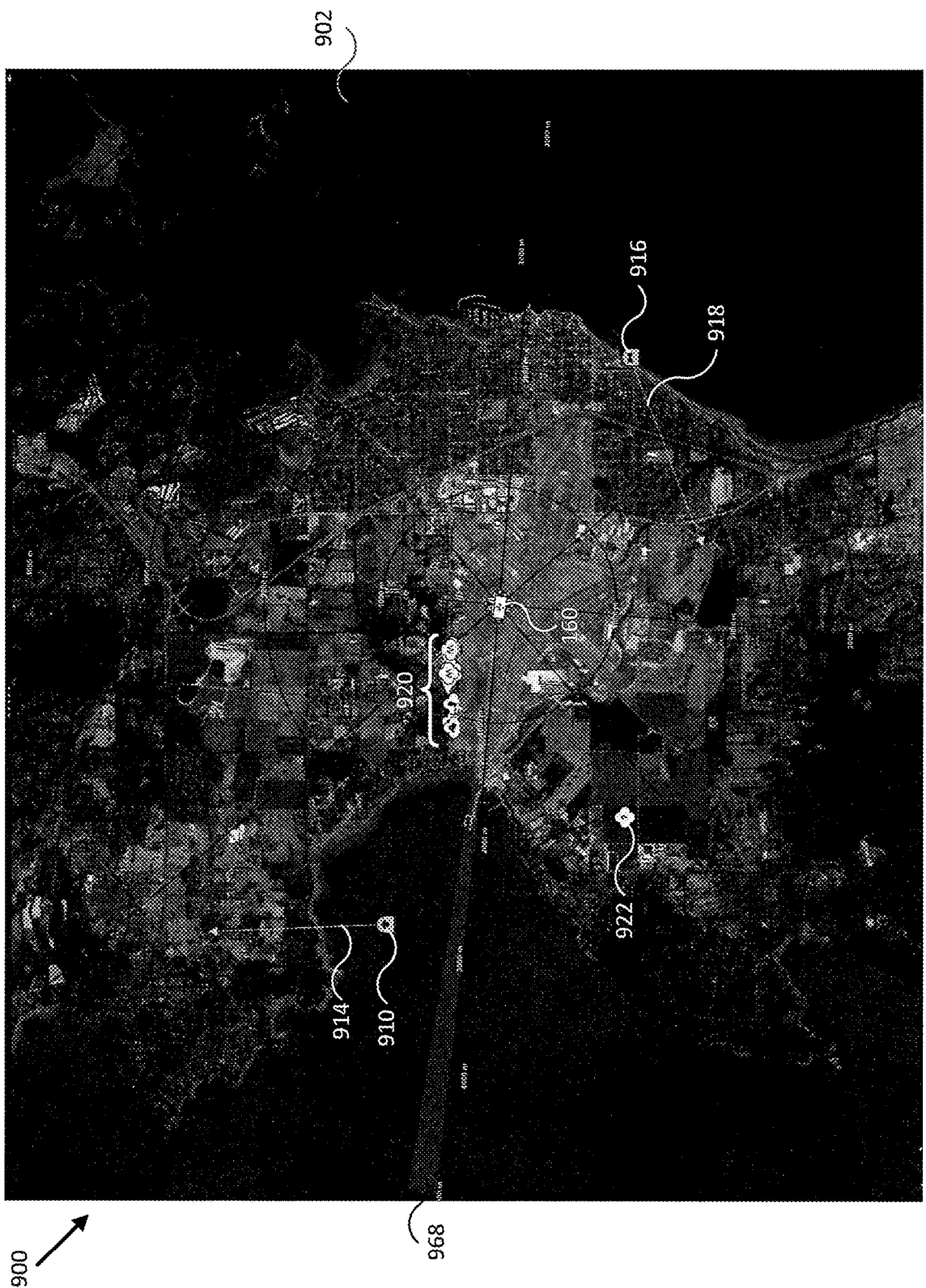
FIGS. 9-10 illustrate display views generated by an MSS in accordance with an embodiment of the disclosure.
Figure 10:
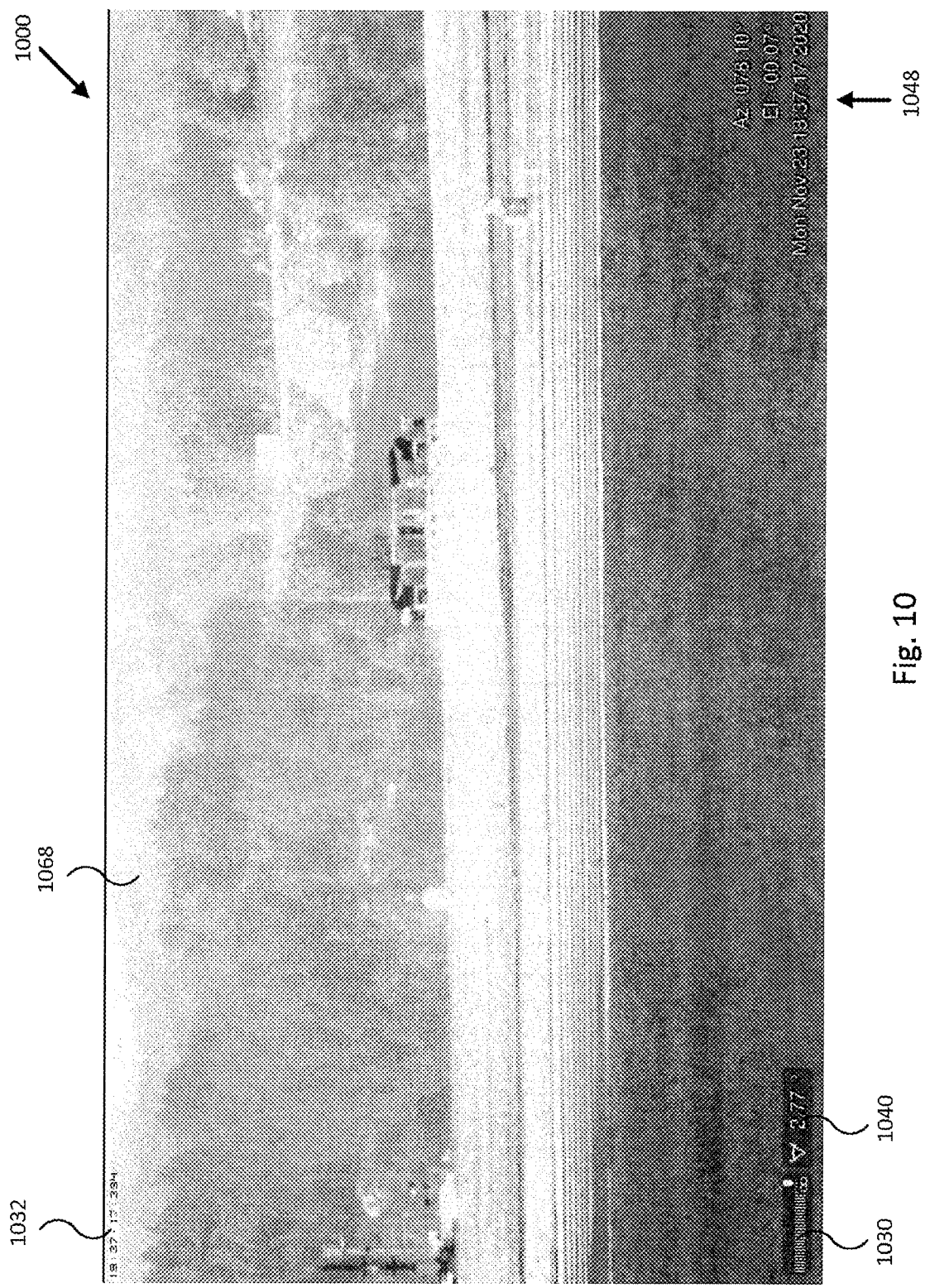

FIGS. 9-10 illustrate display views generated by an MSS in accordance with an embodiment of the disclosure. In FIG. 9, airspace deconfliction display view 900 includes chart data 902 (e.g., satellite and/or mapping chart data) underlying an MSS icon indicating a position of MSS 160, affiliated UAV position icon 910 and associated trajectory indicator 914, which may in some embodiment be a trajectory directive indicator configured to show a trajectory for UAV 910 to deconflict a flight path of UAV 910 relative to other aircraft within airspace deconfliction display view 900 (e.g., a selected airspace monitoring volume shown in airspace deconfliction display view 900). Also shown is unaffiliated UAV position icon 916 and associated trajectory indicator 918, along with detected and classified/identified target icons 920 and unclassified/unidentified but detected target 922. Also shown in airspace deconfliction display view 900 is field of view indicator 968 corresponding to the present field of view of actuated imaging system 368.

In FIG. 10, airspace deconfliction display view 900 includes image data 1068 corresponding to field of view indicator 968 in FIG. 9, along with various information graphics, including present time graphic 1032, recording graphic 1030, field of view indicator 1040, and image data characteristics indicator 1048.

Figure 11:
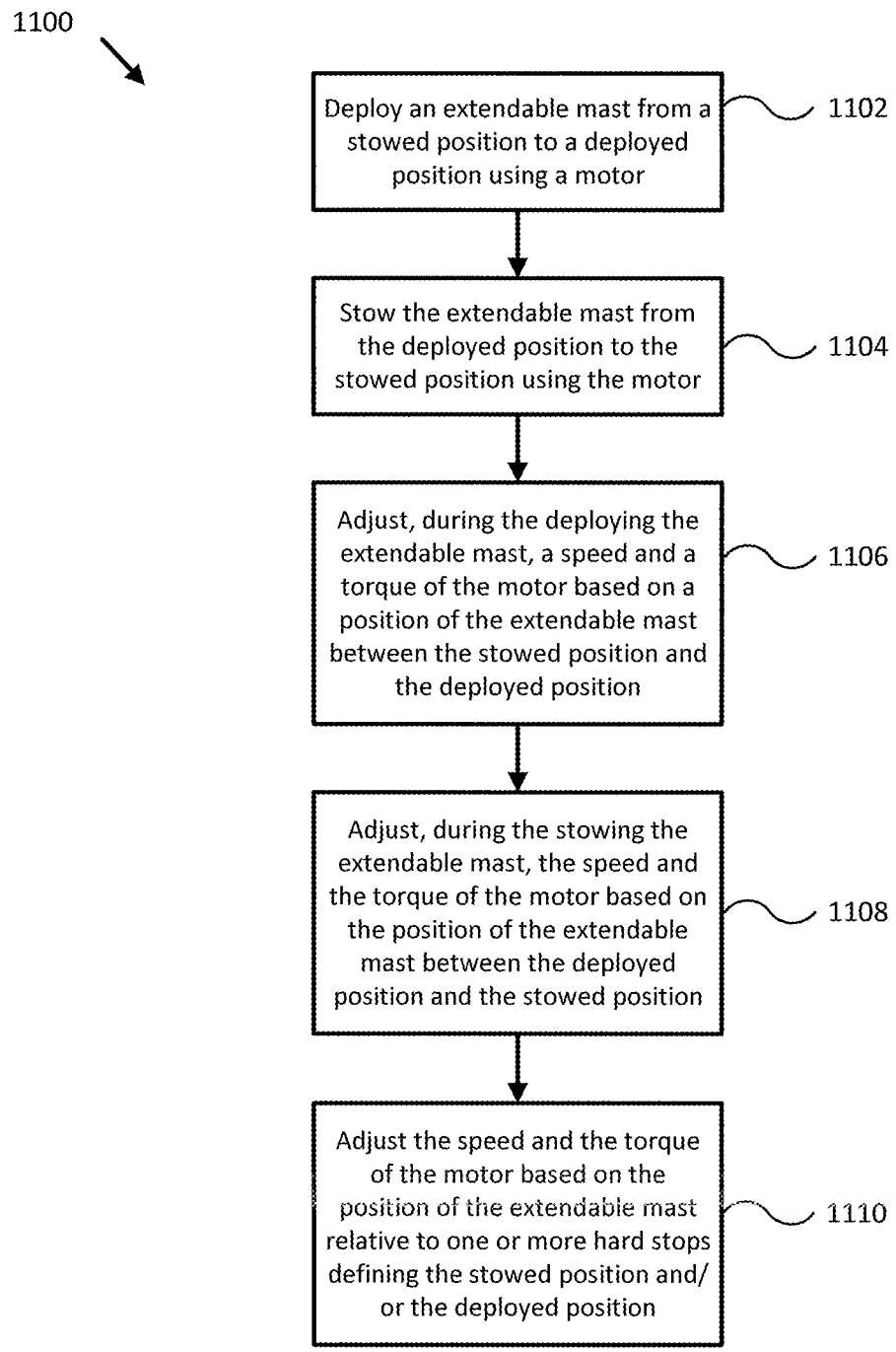
FIG. 11 illustrates a flow diagram of various operations to operate an extendable mast of an MSS in accordance with an embodiment of the disclosure.

FIG. 11 illustrates a flow diagram 1100 of various operations to operate extendable mast 166 of MSS 160 in accordance with an embodiment of the disclosure. In some embodiments, the operations of FIG. 11 may be implemented as software instructions executed by one or more logic devices or controllers associated with corresponding electronic devices, sensors, and/or structures depicted in FIGS. 1-10. More generally, the operations of FIG. 11 may be implemented with any combination of software instructions, mechanical elements, and/or electronic hardware (e.g., inductors, capacitors, amplifiers, actuators, or other analog and/or digital components). Any step, sub-step, sub-process, or block of process 1100 may be performed in an order or arrangement different from the embodiment illustrated by FIG. 11. For example, in other embodiments, one or more blocks may be omitted from or added to process 1100. Furthermore, block inputs, block outputs, various sensor signals, sensor information, calibration parameters, and/or other operational parameters may be stored to one or more memories prior to moving to a following portion of a corresponding process. Although process 1100 is described with reference to systems described in FIGS. 1-10, process 1100 may be performed by other systems different from those systems and including a different selection of electronic devices, sensors, assemblies, mechanisms, platforms, and/or platform attributes.

In block 1102, extendable mast 166 may be deployed from a stowed position to a deployed position using motor(s) 406. For example, extendable mast 166 may be deployed from terrestrial mobile platform 170, such as from a rear bed of pickup truck 330. Extendable mast 166 may be deployed to elevate modular sensor cluster 168 for improved imaging, ranging, and communications, for instance.

In block 1104, extendable mast 166 may be stowed from the deployed position to the stowed position using motor(s) 406. For instance, extendable mast 166 may be collapsed into terrestrial mobile platform 170 (e.g., into the rear bed of pickup truck 330) to facilitate transport or other terrestrial mobility of terrestrial mobile platform 170. In embodiments, block 1104 may include stowing the extendable mast 166 in at least a portion of a mobile terrestrial platform (e.g., terrestrial mobile platform 170).

In block 1106, a speed and a torque of motor(s) 406 may be adjusted during the deploying the extendable mast 166 based on a position of extendable mast 166 between the stowed position and the deployed position. For example, the speed may be increased when switching from an unstow operation zone to a main operation zone, decreased when switching from the main operation zone to a pre-park operation zone, and maintained when switching from the pre-park operation zone to a park operation zone, such as illustrated in FIG. 5 and described above. Similarly, the torque may be increased when switching from the unstow operation zone to the main operation zone, maintained when switching from the main operation zone to the pre-park operation zone, and decreased when switching from the pre-park operation zone to the park operation zone, such as illustrated in FIG. 5 and described above.

In block 1108, the speed and the torque of motor(s) 406 may be adjusted during the stowing the extendable mast 166 based on the position of extendable mast 166 between the deployed position and the stowed position. For instance, the speed may be decreased when switching from a main operation zone to a pre-stow operation zone, and decreased when switching from the pre-stow operation zone to a stow operation zone, such as illustrated in FIG. 6 and described above. Similarly, the torque may be decreased when switching from the main operation zone to the pre-stow operation zone, and decreased when switching from the pre-stow operation zone to the stow operation zone, such as illustrated in FIG. 6 and described above.

In block 1110, the speed and the torque of motor(s) 406 may be adjusted based on the position of extendable mast 166 relative to one or more hard stops defining the stowed position and/or the deployed position. For example, the speed of motor(s) 406 may be reduced to allow a "soft landing" of extendable mast 166 against the one or more hard stops. Similarly, the speed of motor(s) 406 may be increased with distance of extendable mast 166 from the one or more hard stops. The torque of motor(s) 406 may be reduced to limit damage to the one or more hard stops, for instance.

Figure 12:
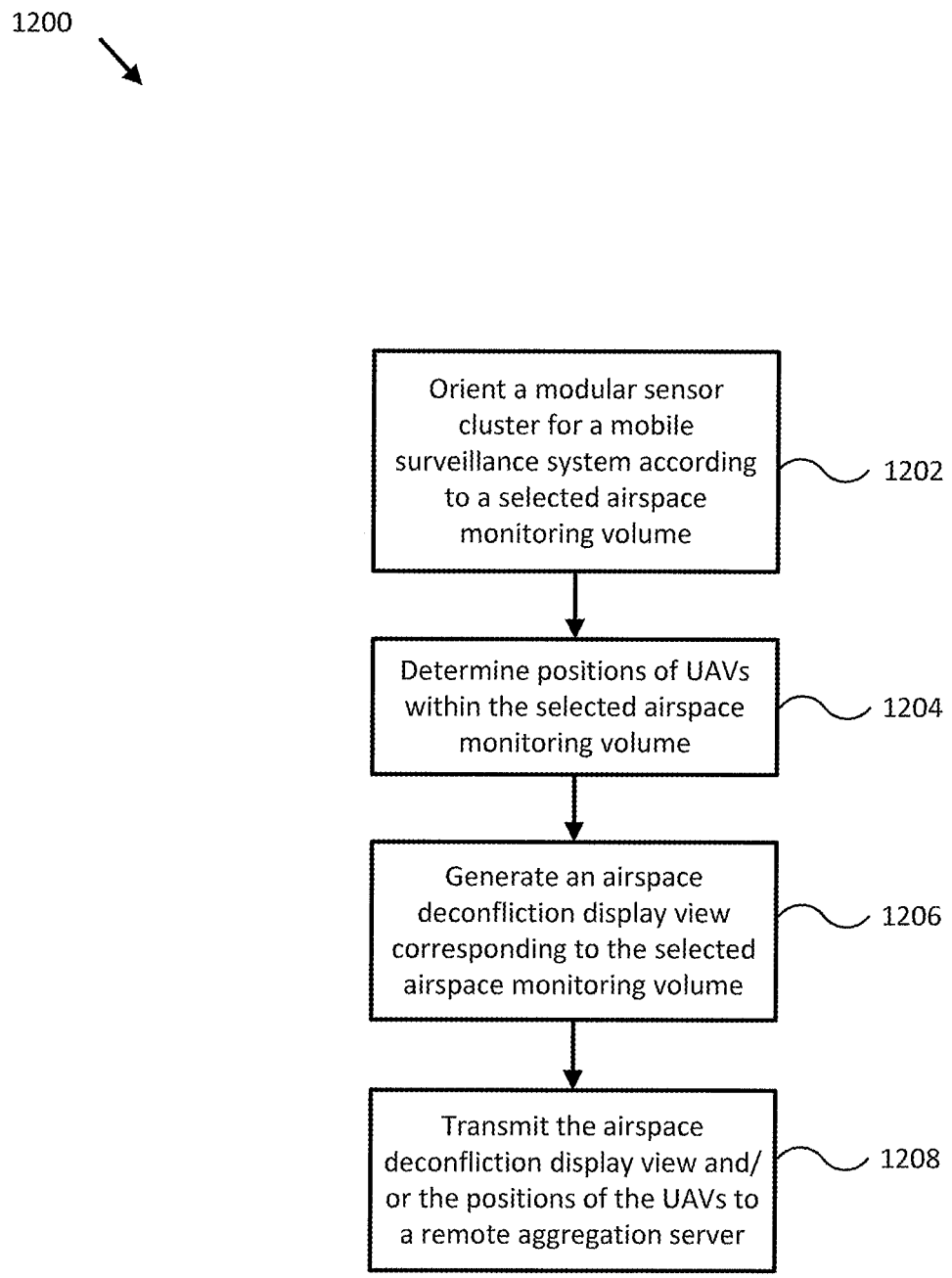
FIG. 12 illustrates a flow diagram of various operations to operate an MSS for UAS operational support in accordance with an embodiment of the disclosure.

FIG. 12 illustrates a flow diagram 1200 of various operations to operate MSS 160 in accordance with an embodiment of the disclosure. In some embodiments, the operations of FIG. 12 may be implemented as software instructions executed by one or more logic devices or controllers associated with corresponding electronic devices, sensors, and/or structures depicted in FIGS. 1-10. More generally, the operations of FIG. 12 may be implemented with any combination of software instructions, mechanical elements, and/or electronic hardware (e.g., inductors, capacitors, amplifiers, actuators, or other analog and/or digital components). Any step, sub-step, sub-process, or block of process 1200 may be performed in an order or arrangement different from the embodiment illustrated by FIG. 12. For example, in other embodiments, one or more blocks may be omitted from or added to process 1200. Furthermore, block inputs, block outputs, various sensor signals, sensor information, calibration parameters, and/or other operational parameters may be stored to one or more memories prior to moving to a following portion of a corresponding process. Although process 1200 is described with reference to systems described in FIGS. 1-10, process 1200 may be performed by other systems different from those systems and including a different selection of electronic devices, sensors, assemblies, mechanisms, platforms, and/or platform attributes.

At block 1202, a modular sensor cluster for an MSS is oriented. For example, MSS controller 162 may be configured to orient modular sensor cluster 168 for MSS 160 according to airspace monitoring volumes 774, 776, and/or 778, as described herein. In some embodiments, MSS controller 162 may be configured to receive user input identifying one or more of airspace monitoring volumes 774, 776, and/or 778 of MSS 160, elevate extendable mast 166 to provide elevated modular sensor mount 366, and/or orient 3D radar assembly 370 according to the received user input to monitor one or more of airspace monitoring volumes 774, 776, and/or 778 of MSS 160.

At block 1204, positions of UAVs are determined. For example, MSS controller 162 may be configured to determine relative and/or absolute positions of one or more UAVs 110 within airspace monitoring volumes 774, 776, and/or 778 selected in block 1202 based, at least in part, on ranging sensor data provided by modular sensor cluster 168, as described herein. In embodiments where MSS 160 includes actuated imaging system 368, MSS controller 162 may be configured to orient actuated imaging system 368 to image the determined relative and/or absolute positions of a selected one of the UAVs and/or unaffiliated aircraft within the selected airspace monitoring volume, as described herein. In other embodiments, MSS controller 162 may be configured to orient 3D radar assembly 370 to encompass the relative and/or absolute positions of a selected one of the UAVs within the selected one or more of airspace monitoring volumes 774, 776, and/or 778 of MSS 160. In still further embodiments, MSS controller 162 may be configured to determine relative and/or absolute positions of unaffiliated aircraft at least within the selected airspace monitoring volume based, at least in part, on the ranging sensor data provided by modular sensor cluster 368.

In block 1206, an airspace deconfliction display view is generated. For example, MSS controller 162 may be configured to generate airspace deconfliction display view 900, 1000 corresponding to airspace monitoring volumes 774, 776, and/or 778 selected in block 1202 based, at least in part, on the relative and/or absolute positions of UAVs 110 determined in block 1204 and/or the airspace monitoring volumes 774, 776, and/or 778 selected in block 1202. In embodiments where MSS 160 includes actuated imaging system 368, MSS controller 162 may be configured to generate airspace deconfliction display view 900, 1000 based, at least in part, on image data provided by actuated imaging system 368. In embodiments where MSS 160 includes communications module 164 (e.g., configured to receive transponder data from the UAVs and/or unaffiliated aircraft at least within the airspace monitoring volumes 774, 776, and/or 778 selected in block 1202), MSS controller 162 may be configured to generate airspace deconfliction display view 900, 1000 based, at least in part, on the received transponder data. In various embodiments, MSS controller 162 may be configured to generate airspace deconfliction display view 900, 1000 based, at least in part, on the determined relative and/or absolute positions of unaffiliated aircraft detected near MSS 160.

More generally, generating the airspace deconfliction display views may include determining one or more deconfliction trajectories for the respective one or more UAVs within the selected airspace monitoring volume based, at least in part, on the determined relative and/or absolute positions of the one or more UAVs; and generating one or more trajectory directive indicators corresponding to the one or more deconfliction trajectories for rendering within the generated airspace deconfliction display view. In other embodiments, generating the airspace deconfliction display views may include determining one or more deconfliction trajectories for the respective one or more UAVs within the selected airspace monitoring volume based, at least in part, on the determined relative and/or absolute positions of the one or more UAVs; and transmitting one or more trajectory directive control signals corresponding to the one or more deconfliction trajectories to the respective one or more UAVs and/or associated base stations. In embodiments where UAV 110 includes imaging system 140, MSS controller 162 may be configured to receive image data from UAV 110 and generate airspace deconfliction display view 900, 1000 based, at least in part, on the received image data from UAV 110.

In block 1208, an airspace deconfliction display view and/or other data is transmitted to a remote aggregation server. For example, MSS controller 162 may be configured to transmit airspace deconfliction display view 900, 1000, image data and/or other sensor data received from UAV 110, and/or the relative and/or absolute positions of UAV 110 via communications module 164 to a remote aggregation server (e.g., co-pilot station 230).

By providing such mobile surveillance systems and techniques for UAV operational support, embodiments of the present disclosure substantially improve the operational flexibility and reliability of unmanned flight platforms. Moreover, such systems and techniques may be used to increase the operational safety of unmanned flight platforms beyond that achievable by conventional systems. As such, embodiments provide UAV rescue parachute deployment systems with significantly increased convenience and performance.

The innovative use of an MSS with 3D radar allows operators of the system to gain air domain awareness, which can serve as a counter-UAS function or serve as an air traffic control support function to allow UAS operators to fly freely and safely. Specifically, embodiments allow UAS operators to fly safely beyond visual line of sight and relieves the operator of using a second person as a spotter to ensure the air is clear of other aircraft.

More generally, embodiments provide two main concepts of operation: Persistent Flight Zone—The MPS is deployed to a specified location and provides air domain awareness in the surrounding area, permitting multiple single pilot aircraft to fly beyond line of sight within the area; Mobile Flight Zone—The MSS is used in direct support of a single sUAS aircraft—providing mobile air domain awareness and ability to deploy with a single operator in any area.

Embodiments provide operators with a multi-functional tool that allows operators to perform a broad set of missions through improved efficiency and effectiveness. Specifically, embodiments achieve the following: Reduce Manpower Demand—Free operators to perform other critical duties and drive down total life cycle costs of operating sUAS systems; Increase Operating Range—Increase the effectiveness of sUAS platforms by supporting extended range of flights; Create Multifunctional Mobile Toolbox—Expand the capabilities of operator's existing technology portfolio to enable tailored response based on threat, topography, terrain, weather and other operational considerations; and Provide Remote Situational Awareness—Leverage proven communications tools to support decision makers at a central command stations (e.g., co-pilot station/remote aggregation server 230).

A skid based MSS converts a commercial pickup into a rapidly deployable command and control center. With radar and EO/IR cameras mounted to a 16-foot extendable mast, MSS 160 provides efficient surveillance coverage day and night. A single operator can deploy, operate, stow, and relocate—all from the cab of the truck. The modular, multi-functional design of MSS 160 allows end users to choose from multiple payload options, including an array of 3D radars. The 3D series of radars has the vertical coverage, low minimum detection velocity and algorithms to detect and track up to 500 airborne targets simultaneously. The radar can monitor the coverage area four times per second, detecting threats in virtually any climate, day and night. The radar's wide 45° beam elevation provides complete hemispherical detection of virtually every land and aerial target, including micro UAS. When mounted on the MSS via an actuated pan/tilt mount, the radar can provide 360° coverage. Such radars mitigate bird false alarms and inform the operator if the target is a person, vehicle, UAS, bird, or unknown. The radar reports target elevation, allowing cameras and countermeasures to point to targets. Multiple scan mode options include fixed sector, alternating sector, and continuous scan.

One embodiment of a UAV/UAS is an advanced military-grade sUAS which delivers a range of versatile Group 2-3 payload capabilities with the agility and single-operator deployment footprint of a proven Group 1 VTOL aircraft. Such embodiments can carry and deliver multiple payloads up to 4.4 lb, via an open architecture, and provide the fastest, most powerful embedded artificial intelligence (AI) computing engine available on an sUAS.

Embodiments of MSS 160 Improve Situational Awareness Through Technology—The technology solutions on MSS 160 offer a drastic increase in visibility range over human abilities. The system's imaging system extends the operator's visual line of sight up to 8 km in both day and night conditions. Outfitted with an actuated 3D radar, the system can detect sUAS at 7 km and larger aircraft up to 15 km. MSS 160 drastically increases situational awareness within the flight zone. Embodiments Improve Safety Through Redundancy—MSS 160, via system sensors and on-board toolkit, provides multi-layered air domain awareness through the following capabilities: Radar→Detection, Classification & Tracking of aircraft in the area, Camera→Visual Identification, AI Classification, ADS-B→Identification and Tracking of broadcasting aircraft, Team Awareness Kit→Identification and Tracking of operator sUASs. An MSS 160 command and control system may incorporate these data feeds to form a common operating picture for the agent, creating layers of redundancy to prevent in-air collisions.

Various use cases are envisioned. Option #1: Fixed Sector/Persistent Flight Zone. Concept of Operations: MSS 160 serves as the "control tower" for sUAS aircraft within a designated area. MSS 160 is outfitted with an actuated 3D radar and deployed in a specified position with a single operator. The radar is aimed in a fixed direction, providing 90° of ground and aerial coverage. An ADS-B receiver (transponder receiver, communications module 164) is used to track military and commercial aircraft within the airspace. MSS 160 operator may be responsible for air domain awareness within the designated airspace and can deconflict all sUAS traffic up to 1200 meters in elevation. The radar will alarm the operator and classify any target within range. The operator, by slewing the camera to the target, can further identify the target to determine whether it needs to be avoided. The position of any operator sUAS aircraft in the area will be broadcast to MSS 160 via the Team Awareness Kit. Through use of MSS 160 land mobile radio, the operator may communicate and deconflict airspace with the sUAS pilots in the field. Within the designated scanning sector, operator sUAS aircraft can be flown by a single pilot with ranges beyond line of sight within the covered area.

Option #2: 360° Scanning Sector. Concept of Operations: MSS 160 performs the control tower mission exactly as described in option 1 with coverage area expanded to 360°. Full radar coverage around the truck would be accomplished by installing back-to-back radar panels on top of the mast and using a 90-degree step panning function to detect targets.

Option #3: Mobile Flight Zone. A FLIR LVSS truck equipped with a R8SS-3D will enable a single operator to operate the sUAS aircraft from the cab of the truck with improved situational awareness and flight safety. As per current flight operations, the sUAS aircraft will connect to a base station and be operated via ruggedized tablet. The base station, however, will be directly connected to MSS 160, giving MSS 160 precise ownship position from the aircraft's on-board GPS. Embodiments will use the aircraft's position to continuously slew the actuated 3D radar and imaging system along the track of the aircraft, creating a surrounding area of situational awareness. Alarm zones, configured within the system, will notify the operator when an intrusion is detected within the aircraft's flight zone. The 3D radar may classify the target as person, vehicle, UAS, bird, or unknown. The imaging system (either of MSS 160 or UAV 110) can further identify targets via AI video analytics or further investigation by the operator.

Leveraging LVSS Capabilities for sUAS Operation—In addition to air domain awareness, MSS 160 offers the sUAS operator several key capabilities: TAK Integration—each MSS 160 is equipped with a communications module that can broadcast sUAS position and share pictures, videos and points of interest; Bi-Directional TAK—via connection to the operators remote TAK server, MSS 160 displays blue force tracking and positions of other operator technology assets; Video Archiving—through the connection to the base station, direct video from the aircraft may be displayed and archived via MSS 160 data processing system; Charging—MSS 160 design features power take off from the vehicle that can be leveraged to charge batteries, eliminating the need for a standalone generator; Antenna mounting—base station antennas can be mounted on the extendable mast to provide improved communications with the aircraft.

Cross-Functional, Multi-Layered Situational Awareness—In addition to providing a technology alternative to the human spotter, the integrated MSS/UAS package enables a single operator to accomplish a wide range of mobile surveillance missions simultaneously. Depending on mission need, the operator could utilize the quickly deployable MSS to provide video surveillance at ranges of 5+ miles. When items of interest move beyond line of sight, the operator deploys the actuated 3D radar to gain a new vantage point.

Enhance Response & Resolution—DETECT→IDENTIFY→CLASSIFY→TRACK→RESOLVE. Combining the capability set of MSS 160 and UAV 110 enables the operator to manage the apprehension process from detection to resolution. UAV 110 is a particularly effective tool in enhancing agent safety during apprehension by providing bird's eye video to agents and a deterrence to running or resisting arrest.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A mobile surveillance system (MSS), the MSS comprising:
   an extendable mast configured to be secured to a mobile terrestrial platform and provide an elevated modular sensor mount;
   a motor configured to control movement of the extendable mast between a stowed position and a deployed position; and
   a logic device configured to communicate with the extendable mast and the motor, wherein the logic device is configured to:
      adjust a speed setting of the motor based on a position of the extendable mast between the stowed position and the deployed position and based on a direction of movement of the extendable mast towards the stowed position or the deployed position; and
      adjust a torque of the motor based on the position of the extendable mast and based on the direction of movement of the extendable mast;
   wherein:
      during a deployment of the extendable mast, the speed setting and torque of the motor are adjusted based on the position of the extendable mast in at least a first zone, a second zone, a third zone, or a fourth zone between the stowed position and the deployed position;
      the first zone is an unstow operation zone, with the speed setting of the motor adjusted to a first speed setting and the torque of the motor adjusted to a first torque;
      the second zone is a main operation zone, with the speed setting of the motor adjusted to a second speed setting and the torque of the motor adjusted to a second torque;
      the third zone is a pre-park operation zone, with the speed setting of the motor adjusted to a third speed setting and the torque of the motor remaining at the second torque;
      the fourth zone is a park operation zone, with the speed setting of the motor remaining at the third speed setting and the torque of the motor adjusted to a third torque; and
      the third speed setting is less than the second speed setting.

2. The MSS of claim 1, further comprising one or more hard stops defining the stowed position and/or the deployed position of the extendable mast, wherein the logic device is configured to adjust the speed setting of the motor and the torque of the motor based on the position of the extendable mast relative to the one or more hard stops.

3. The MSS of claim 2, wherein:
   the speed setting of the motor is adjusted to provide a soft landing of the extendable mast into the one or more hard stops, while the torque of the motor is adjusted to press the extendable mast into the one or more hard stops;
   the torque is chosen to ensure safe operation in the event of obstruction in all zones except the park and stow zones; and
   the torque is chosen to ensure mechanical stability and positional accuracy with the mast pressed into the hard stops in the park and stow zones.

4. The MSS of claim 1, wherein:
   the second speed setting is greater than the first speed setting;
   the third speed setting is greater than the first speed setting;
   the second torque is greater than the first torque; and
   the third torque is less than the first torque and less than the second torque.

5. The MSS of claim 1, wherein during a stowing of the extendable mast, the speed setting and torque of the motor are adjusted based on the position of the extendable mast in at least a first stowing zone, a second stowing zone, or a third stowing zone between the stowed position and the deployed position.

6. The MSS of claim 5, wherein:
   the first stowing zone is a main stowing operation zone, with the speed setting of the motor adjusted to a first stowing speed setting and the torque of the motor adjusted to a first stowing torque;
   the second stowing zone is a pre-stow stowing operation zone, with the speed setting of the motor adjusted to a second stowing speed setting and the torque of the motor adjusted to a second stowing torque; and the third stowing zone is a stow stowing operation zone, with the speed setting of the motor adjusted to a third stowing speed setting and the torque of the motor adjusted to a third stowing torque.

7. The MSS of claim 6, wherein:

the second stowing speed setting is less than the first stowing speed setting;

the third stowing speed setting is less than the second stowing speed setting;

the second stowing torque is less than the first stowing torque; and the third stowing torque is less than the second stowing torque.

8. The MSS of claim 1, wherein:

the speed setting of the motor is adjusted between 350 RPM and 5000 RPM; and the torque of the motor is adjusted between 0.6 Nm and 6 Nm.

9. The MSS of claim 1, further comprising a modular sensor cluster configured to couple to the modular sensor mount of the extendable mast and provide sensor data.

10. The MSS of claim 1, further comprising:

a terrestrial mobile platform, wherein the extendable mast is coupled to the terrestrial mobile platform to extend from or collapse into the terrestrial mobile platform.

11. A mobile surveillance system (MSS), the MSS comprising:

an extendable mast configured to be secured to a mobile terrestrial platform and provide an elevated modular sensor mount;

a motor configured to control movement of the extendable mast between a stowed position and a deployed position; and a logic device configured to communicate with the extendable mast and the motor, wherein the logic device is configured to:

adjust a speed setting of the motor based on a position of the extendable mast between the stowed position and the deployed position and based on a direction of movement of the extendable mast towards the stowed position or the deployed position; and adjust a torque of the motor based on the position of the extendable mast and based on the direction of movement of the extendable mast;

wherein:

during a stowing of the extendable mast, the speed setting and torque of the motor are adjusted based on the position of the extendable mast in at least a first zone, a second zone, or a third zone between the stowed position and the deployed position;

the first zone is a main operation zone, with the speed setting of the motor adjusted to a first speed setting and the torque of the motor adjusted to a first torque;

the second zone is a pre-stow operation zone, with the speed setting of the motor adjusted to a second speed setting and the torque of the motor adjusted to a second torque; and the third zone is a stow operation zone, with the speed setting of the motor adjusted to a third speed setting and the torque of the motor adjusted to a third torque;

the second speed setting is less than the first speed setting;

the third speed setting is less than the second speed setting;

the second torque is less than the first torque; and the third torque is less than the second torque.

12. A method comprising:

deploying an extendable mast from a stowed position to a deployed position using a motor, wherein the extendable mast is configured to provide an elevated modular sensor mount;

stowing the extendable mast from the deployed position to the stowed position using the motor; and adjusting, during the deploying the extendable mast, a speed setting and a torque of the motor based on a position of the extendable mast between the stowed position and the deployed position;

wherein:

during a deployment of the extendable mast, the speed setting and torque of the motor are adjusted based on the position of the extendable mast in at least a first zone, a second zone, a third zone, or a fourth zone between the stowed position and the deployed position;

the first zone is an unstow operation zone, with the speed setting of the motor adjusted to a first speed setting and the torque of the motor adjusted to a first torque;

the second zone is a main operation zone, with the speed setting of the motor adjusted to a second speed setting and the torque of the motor adjusted to a second torque;

the third zone is a pre-park operation zone, with the speed setting of the motor adjusted to a third speed setting and the torque of the motor remaining at the second torque;

the fourth zone is a park operation zone, with the speed setting of the motor remaining at the third speed setting and the torque of the motor adjusted to a third torque; and the third speed setting is less than the second speed setting;

wherein the adjusting, during the deploying the extendable mast, the speed setting and the torque of the motor comprises:

decreasing the torque while maintaining the speed setting when switching from the pre-park operation zone to the park operation zone.

13. The method of claim 12, further comprising:

adjusting, during the stowing the extendable mast, the speed setting and the torque of the motor based on the position of the extendable mast between the deployed position and the stowed position.

14. The method of claim 13, wherein the adjusting the speed setting of the motor comprises, in a deployment operation of the extendable mast:

increasing the speed setting when switching from the unstow operation zone to the main operation zone; and decreasing the speed setting when switching from the main operation zone to the pre-park operation zone.

15. The method of claim 13, wherein the adjusting the speed setting of the motor comprises, in a stowing operation of the extendable mast:

decreasing the speed setting when switching from a main stowing operation zone to a pre-stow operation zone; and decreasing the speed setting when switching from the pre-stow operation zone to a stow operation zone.

16. The method of claim 15, wherein the adjusting the torque of the motor comprises, in a stowing operation of the extendable mast:

decreasing the torque when switching from the main stowing operation zone to the pre-stow operation zone; and decreasing the torque when switching from the pre-stow operation zone to the stow operation zone.

17. The method of claim 13, wherein the adjusting the torque of the motor comprises, in a deployment operation of the extendable mast:

increasing the torque when switching from the unstow operation zone to the main operation zone;

maintaining the torque when switching from the main operation zone to the pre-park operation zone; and decreasing the torque when switching from the pre-park operation zone to the park operation zone.

18. The method of claim 12, wherein:

deploying the extendable mast comprises deploying the extendable mast from a mobile terrestrial platform; and stowing the extendable mast comprises stowing the extendable mast in at least a portion of the mobile terrestrial platform.

19. The method of claim 12, further comprising:

adjusting the speed setting and the torque of the motor based on the position of the extendable mast relative to one or more hard stops defining the stowed position and/or the deployed position.

20. The method of claim 12, wherein the adjusting, during the deploying the extendable mast, the speed setting and the torque of the motor comprises:

maintaining the torque while decreasing the speed setting when switching from the main operation zone to the pre-park operation zone.

* * * * *

UNITED STATES PATENT AND TRADEMARK OFFICE
CERTIFICATE OF CORRECTION

| | | |
|---|---|---|
| PATENT NO. | : 12,444,832 B2 | Page 1 of 1 |
| APPLICATION NO. | : 17/584301 | |
| DATED | : October 14, 2025 | |
| INVENTOR(S) | : Trevor Davis, Edward Butler and Bruce Haines | |

It is certified that error appears in the above-identified patent and that said Letters Patent is hereby corrected as shown below:

In the Claims

Column 1, Lines 14-15, change "U.S. patent application Ser. No." to --U.S. Patent Application No.--.

Signed and Sealed this
Eighteenth Day of November, 2025

John A. Squires
*Director of the United States Patent and Trademark Office*